(12) United States Patent
Rajanna et al.

(10) Patent No.: US 12,139,168 B2
(45) Date of Patent: Nov. 12, 2024

(54) STATIONARY VEHICLE IMPACT ANALYSIS AND DECISION MAKING WITH SERVICE INTERFACE

(71) Applicant: Adeia Guides Inc., San Jose, CA (US)

(72) Inventors: VasanthRaj Rajanna, Karnataka (IN); Reda Harb, Bellevue, WA (US)

(73) Assignee: Adeia Guides Inc., San Jose, CA (US)

( * ) Notice: Subject to any disclaimer, the term of this patent is extended or adjusted under 35 U.S.C. 154(b) by 192 days.

(21) Appl. No.: 17/715,341

(22) Filed: Apr. 7, 2022

(65) Prior Publication Data

US 2023/0256996 A1 Aug. 17, 2023

(30) Foreign Application Priority Data

Feb. 17, 2022 (IN) .............................. 202241008320

(51) Int. Cl.
*B60W 60/00* (2020.01)
*B60W 30/06* (2006.01)
(Continued)

(52) U.S. Cl.
CPC ........ *B60W 60/0015* (2020.02); *B60W 30/06* (2013.01); *B60W 30/09* (2013.01);
(Continued)

(58) Field of Classification Search
CPC .. B60W 60/0015; B60W 30/06; B60W 30/09; B60W 50/14; B60W 2420/403; B60W 2420/54; B60W 2540/215; B60W 2554/4042; B60W 2554/4045; B60W 2554/802; B60W 2556/10; B60W 2556/45; B60W 60/0016; B60W 30/0956;
(Continued)

(56) References Cited

U.S. PATENT DOCUMENTS 11,787,441 B2 10/2023 Rajanna et al.
2017/0254895 A1 9/2017 Tong et al.
(Continued)

OTHER PUBLICATIONS

U.S. Appl. No. 17/715,340, filed Apr. 7, 2022, VasanthRaj Rajanna.
(Continued)

*Primary Examiner* — Rodney A Butler
(74) *Attorney, Agent, or Firm* — Haley Guiliano LLP

(57) ABSTRACT

Systems and methods are presented herein for enabling a vehicle, configured to support autonomous vehicle operation, to change a location of the vehicle based on the detection of an impending impact with the vehicle. A starting location of the vehicle is determined while the vehicle is parked, unoccupied, and comprises an inactive powertrain. In response to determining a watchdog state is enabled, data corresponding to the location is accessed from within a threshold distance of the vehicle. An identifier and a trajectory of an object is determined. In response to determining that the trajectory corresponds to an impact path with the vehicle, an evasive route for the vehicle is determined that terminates at a safe location not subjected to the impending impact. An instruction to activate the vehicle powertrain and an autonomous mode of the vehicle to execute the identified evasive route is transmitted for the vehicle to process.

20 Claims, 13 Drawing Sheets

(51) Int. Cl.
   *B60W 30/09* (2012.01)
   *B60W 50/14* (2020.01)
   *G05D 1/00* (2024.01)
   *G05D 1/02* (2020.01)
   *G08G 1/14* (2006.01)
   *G08G 1/16* (2006.01)

(52) U.S. Cl.
   CPC .......... *B60W 50/14* (2013.01); *G05D 1/0061* (2013.01); *G05D 1/0214* (2013.01); *G08G 1/148* (2013.01); *G08G 1/16* (2013.01); *G08G 1/164* (2013.01); *G08G 1/166* (2013.01); *G08G 1/168* (2013.01); *B60W 2420/403* (2013.01); *B60W 2420/54* (2013.01); *B60W 2540/215* (2020.02); *B60W 2554/4042* (2020.02); *B60W 2554/4045* (2020.02); *B60W 2554/802* (2020.02); *B60W 2556/10* (2020.02); *B60W 2556/45* (2020.02)

(58) Field of Classification Search
   CPC .... G05D 1/0061; G05D 1/0214; G08G 1/148; G08G 1/16; G08G 1/164; G08G 1/166; G08G 1/168; G08G 1/096725; G08G 1/143; B62D 15/0265; B62D 15/0285
   See application file for complete search history.

(56) References Cited

U.S. PATENT DOCUMENTS

| | | | |
|---|---|---|---|
| 2019/0147744 A1 | 5/2019 | Grimm et al. | |
| 2020/0148200 A1* | 5/2020 | Lerner | G08G 1/162 |
| 2022/0105927 A1 | 4/2022 | Kozono et al. | |
| 2023/0260403 A1 | 8/2023 | Rajanna et al. | |
| 2024/0051576 A1 | 2/2024 | Rajanna et al. | |

OTHER PUBLICATIONS

Hawkins, Andrew J., "Tesla's Smart Summon parking feature has been used over a million times", The Verge, retrieved at https://www.theverge.com/2019/10/23/20929438/tesla-smart-summon-use-one-million-q3-2019, on Jun. 7, 2023, Oct. 23, 2019.

U.S. Appl. No. 18/237,805, filed Aug. 24, 2023, VasanthRaj Rajanna.

* cited by examiner

STATIONARY VEHICLE IMPACT ANALYSIS AND DECISION MAKING WITH SERVICE INTERFACE

CROSS-REFERENCE TO RELATED APPLICATIONS

This application claims the benefit of Indian Provisional Application No. 202241008320, filed Feb. 17, 2022, the disclosure of which is hereby incorporated by reference herein in its entirety.

BACKGROUND

The present disclosure is directed to systems and methods for performing an impact analysis for a stationary vehicle, and more particularly, to systems and methods that generate executable autonomous vehicle movement instructions in response to determining a stationary vehicle is at risk for an impending impact.

SUMMARY

Vehicles typically operate under one of three vehicles states. The first vehicle state is an "OFF" or "monitor" state in which the vehicle awaits an input to either achieve a second "accessory" state or a third "ignition ON" state. The second accessory state typically enables all electronics in the vehicle to operate without the powertrain or propulsion system being activated. In the second accessory state, much like the first monitor state, a vehicle is typically incapable of moving unless the transmission is shifted to neutral, at which point a vehicle operator may manually move the vehicle by steering and activating the throttle. The third ignition state activates the engine, whether gasoline or electric powered, and the powertrain thereby enabling the vehicle to move. In the third ignition state, a vehicle is fully functional, and all proximity sensors are active to enable any autonomous or avoidance features to function.

What is needed is a vehicle state corresponding to the monitor state that enables a vehicle to make a decision or receive instructions to change to the third ignition state and avoid an impending collision or impact. For example, a vehicle may be parked and in an "OFF" or "monitor" state. While the vehicle is parked, there could be an object on a trajectory that would ultimately lead to an impact with the parked vehicle. Ideally, the parked vehicle would be able to detect the impending impact and perform a state change that would enable the parked vehicle to move to a safe location.

Some currently available approaches have autonomous vehicle operation enabled for collision avoidance, but these autonomous modes require the vehicle to be occupied by a driver and/or require the vehicle to already be in an "ignition ON" state. Other currently available approaches detect and report damage to a parked vehicle left alone but are not configured to start the vehicle and/or change to an "ignition ON" state in order to enable the vehicle to perform a maneuver to avoid an impending impact.

Described herein are systems and methods for enabling a stationary vehicle without a driver to determine whether the stationary vehicle is at risk for an impending impact, identify an evasive route to avoid the impending impact, maneuver out of a current stationary position to a new location via the evasive route to avoid the impending impact, and report to the vehicle owner the final position of the vehicle as well as details regarding the reason the vehicle had to move.

For example, systems and methods described herein monitor the environment around a parked vehicle that is unoccupied and does not have the powertrain active. A location of the vehicle is determined, wherein the vehicle is parked, unoccupied, and does not have an active powertrain. Data corresponding to the location is accessed wherein the data comprises identifiers of at least one object within a threshold distance of the location and a trajectory of the at least one object. For example, GPS data may be utilized to identify objects within 500 meters of the parked vehicle and the GPS data may be utilized to determine a relative speed and trajectory with respect to the parked vehicle. The trajectory is reviewed to determine if the trajectory corresponds to an impact path with the parked vehicle. In response to determining that the trajectory corresponds to an impact path with the vehicle, an evasive route is identified and/or generated for the vehicle and a safe location to terminate the evasive route is also identified. An instruction to activate the vehicle powertrain and an autonomous mode of the vehicle is generated such that when the instruction is received and processed by the vehicle, the vehicle is configured to execute the identified evasive route, so the vehicle ends up in the safe location and avoids the impact.

In another example, at least one vehicle profile is retrieved. In some embodiments, the at least one vehicle profile may be associated with either a particular driver or a particular vehicle via a vehicle identification number. A first location of a vehicle corresponding to the at least one vehicle profile is determined based on location data associated with the at least one vehicle profile. At least one safe location from a plurality of tracked locations is retrieved, wherein the at least one safe location is within a threshold distance of the first location (e.g., within 500 meters of the first location) and is safe from the impact from an object. Real-time object data associated with the first location is accessed. Based on the object data, a determination is made that at least one object corresponds to a trajectory that corresponds to an impact path with the vehicle. In response to determining that the trajectory corresponds to an impact path with the vehicle, generating an evasive route for the vehicle based on the impact path, wherein the evasive route circumvents the impact path, and wherein the evasive route terminates at the at least one safe location. An instruction to activate a powertrain of the vehicle and an autonomous mode of the vehicle, to execute the identified evasive route, is generated. Then the instruction is transmitted to the vehicle for processing and execution.

These techniques solve the problems of other approaches described above. In particular, this approach does not rely on a vehicle system's ability to process environment data while the powertrain is active and instead relies on data available from a plurality of remote sources to decide whether to activate a vehicle's powertrain and execute a maneuver. Thus, a vehicle can be left alone to escape an impending impact without user input and, alternatively, the vehicle can be communicably coupled to a user's remote device to enable the user to keep track of the vehicle status while providing modification instructions to generated escape instructions. Additionally, this approach does not limit data used to identify objects and impending impacts to vehicle sensor data. By interfacing with remote services and accessing a plurality of data sources, as opposed to being limited to proximity sensors incorporated into the vehicle system, the system can keep track of, in real time, more objects at farther distances to allow for appropriate processing and execution time for the vehicle to escape a potential impact. For example, some current vehicle proximity sensor approaches are limited to a few feet from a vehicle body and the data may lose resolution depending on weather conditions. The approach described herein also addresses the deficiencies in relying on a vehicle's powertrain to be active in order to improve collision avoidance by having all vehicle systems active. For example, a new vehicle state (e.g., a "watchdog" state), may be implemented to allow the vehicle to receive inputs to activate systems required for autonomous driving and execute an evasive route to a safe location. This watchdog state may be configured to monitor for instructions without requiring significant vehicle power use until the vehicle receives an instruction to activate systems such as the powertrain for executing an autonomous-mode evasive route to the safe location.

In some embodiments, determining a location of the vehicle comprises accessing GPS data corresponding to the vehicle. In some embodiments, the data corresponding to the location comprises at least one of GPS data, vehicle sensor data, camera data, and sonar data from devices transmitting data corresponding to a threshold distance from the location. In some embodiments, the identifier of the at least one object within a threshold distance comprises descriptive information about the at least one object, including an estimated size and speed.

In some embodiments, determining whether the trajectory corresponds to the impact path with the vehicle comprises determining a starting location of the object and determining a speed of the object. The starting location of the object is compared to a second location of the object within a threshold time period of data received corresponding to the starting location. Based on the comparing, the trajectory of the object is generated. In some embodiments, the trajectory is compared to a generated impact path relative to the vehicle. A numerical value may be used to quantify a similarity between the impact path and the trajectory (e.g., a percentage match may be used to determine similarity). If the comparison results in a percentage match that exceeds a threshold (e.g., more than 50% match), then the trajectory of the object may be flagged as resulting in an impending impact with the vehicle.

In some embodiments, movement patterns of objects similar to the object, wherein objects similar to the object are identified based on the object identifier, are retrieved from a memory. A statistical analysis is performed, wherein the statistical analysis is used to determine a probability that the object will maintain a trajectory corresponding to the impact path by generating a probability score. The probability score to is compared to a threshold (e.g., a higher probability is indicative of a higher likelihood the object is on a trajectory to impact the vehicle). In response to determining that the probability score meets or exceeds the threshold, an evasive route for the vehicle is identified.

In some embodiments, a device associated with a user of the vehicle is identified. A determination is made whether the device is communicably coupled to the vehicle. In response to determining the device is communicably coupled to the vehicle, a notification is generated for the user on the device, wherein the notification corresponds to a vehicle status. In some embodiments, the notification comprises at least one of an impact event warning and description, a planned evasive route map, and a safe destination. In some embodiments, the notification further comprises at least one selectable option comprising at least one of an option to modify the evasive route, an option to modify the safe destination, an option to ignore the notification, and an option to prevent activation of autonomous mode.

In some embodiments, the at least one vehicle profile comprises at least one of a vehicle identification number, a license plate number, a state of registration, an owner identifier, and an owner profile. In some embodiments, the owner profile comprises at least one of a residential address, a work address, a route history, and at least one frequent destination.

In some embodiments, retrieving the at least one safe location comprises identifying, based on a service, the plurality of tracked locations. In response to identifying the plurality of tracked locations, real-time object data, associated with each of the plurality of tracked locations, is accessed. Based on the object data, at least one location of the plurality of tracked locations is determined to be devoid of impact paths. Based on the determining, a safe status is assigned to the at least one location. Data identifying the at least one location as the at least one safe location is transmitted to the vehicle.

In some embodiments, the service comprises an emergency service, wherein the emergency service is configured to identify safe locations within a threshold distance of the vehicle based on emergency data available via at least one of a police dispatcher, a medical dispatcher, and a fire department dispatcher. In some embodiments, the service comprises a parking service, wherein the parking service is configured to identify available parking locations within a threshold distance of the vehicle based on object data associated with each available parking location.

In some embodiments, a probability that the object will maintain the trajectory corresponding to the impact path is determined based on object data within a threshold period of time from a current time (e.g., data from within five minutes of a current time). The probability is compared to a threshold probability (e.g., the threshold probability may be 50% or greater, depending on system or profile settings, which may be altered depending on the available sources of object data). In response to determining the probability meets or exceeds the threshold probability, an instruction to display a notification at an end user device associated with the at least one vehicle profile is generated, wherein the notification comprises the at least one location identifier. In some embodiments, the at least one safe location comprises at least two location identifiers. Additionally, the notification may comprise two selectable options for each of the at least two location identifiers. The two selectable options, when selected, correspond to respective evasive route instructions for each respective safe location corresponding to each of the at least two location identifiers. Once selected, the instructions are processed by the vehicle for execution and avoidance of the impending impact.

BRIEF DESCRIPTIONS OF THE DRAWINGS

The above and other objects and advantages of the disclosure may be apparent upon consideration of the following detailed description, taken in conjunction with the accompanying drawings, in which:

FIG. 1 illustrates a relocation scenario in which an impending impact with a stationary vehicle with an inactive powertrain is detected and a safe location is identified for generating an evasive route for the stationary vehicle to avoid the impending impact, in accordance with some embodiments of the disclosure;

FIG. 2 illustrates a relocation scenario in which an impending impact with a stationary vehicle is detected via an apparatus independent of the vehicle and a service used, at least in part, to identify a safe location for generating an evasive route for the stationary vehicle while also providing a vehicle status notification to a remote device, in accordance with some embodiments of the disclosure;

DETAILED DESCRIPTION

Methods and systems are provided herein for determining a stationary vehicle with an inactive powertrain is at risk for an impending impact, locating a safe location where the vehicle would not be at risk for the impending impact, and generating an instruction enabling the vehicle to autonomously move from a current location to the safe location, thereby avoiding the impending impact.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, random access memory (RAM), etc.

Figure 1:
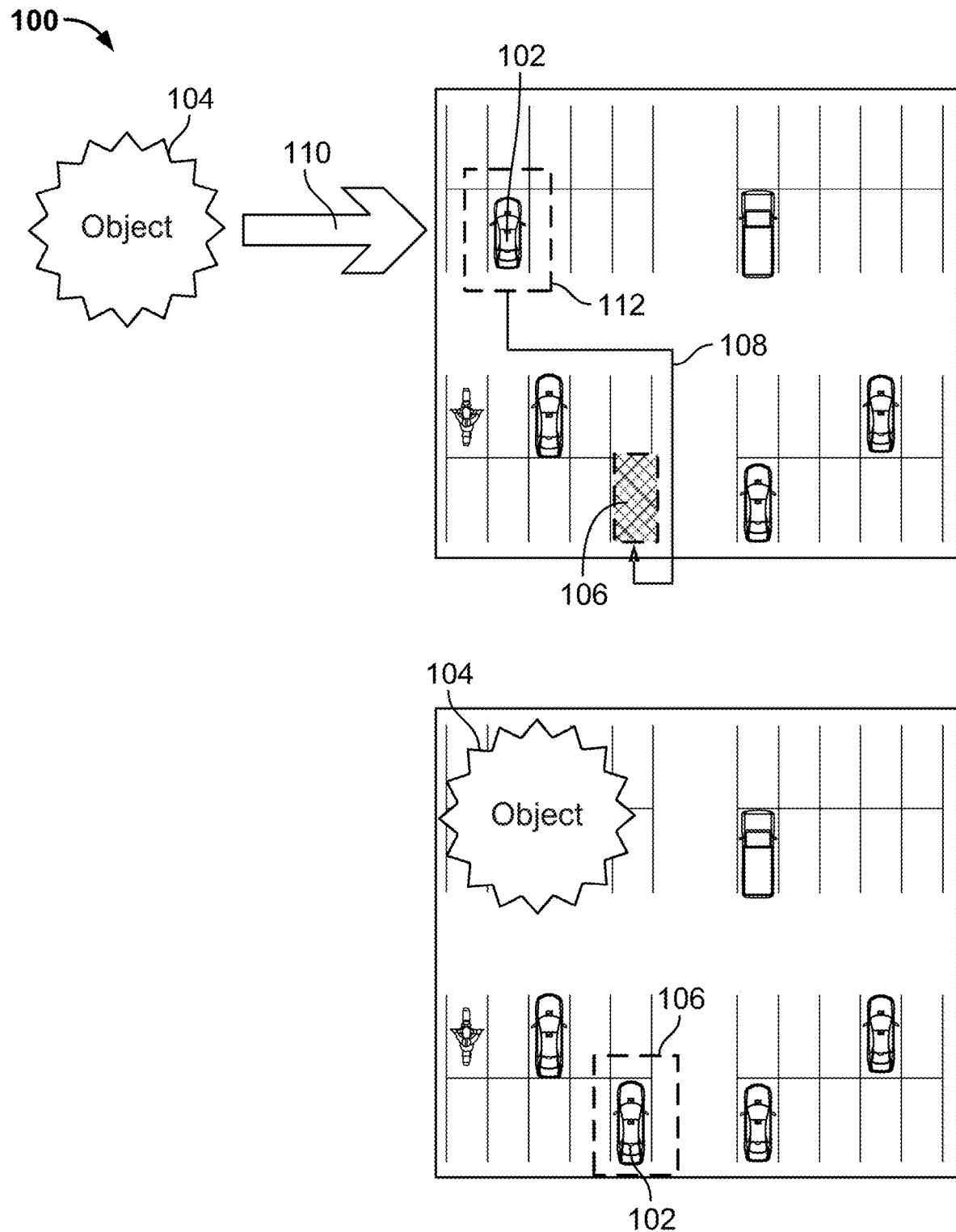

FIG. 1 depicts relocation scenario 100, in which an impending impact with vehicle 102, which comprises an inactive powertrain, is detected and safe location 106 is identified for generating evasive route 108 for vehicle 102, enabling vehicle 102 to avoid the impending impact, in accordance with some embodiments of the disclosure. Although relocation scenario 100 depicts certain components and devices, relocation scenario 100 may comprise any or all of the components or devices depicted in FIGS. 2-4, 7, 12 and 13. Additionally, relocation scenario 100 may be executed by using any or all of the steps depicted in the methods disclosed in FIGS. 5, 6, and 8-11.

For semi-autonomous vehicles to become fully autonomous, it is expected that smarter infrastructure (e.g., an infrastructure communicatively coupled to vehicles and services monitoring the movement of vehicles) will be built, and existing roads will be upgraded (e.g., incorporating more devices to better characterize the movement of vehicles and the current status of roads and areas designated for parking). Some examples include the use of smart paint, embedding sensors into roads, as well as solar and piezoelectric panels to have the infrastructure needed to support self-driving cars. It is important for smart vehicles to be able to move to different locations, even when they are vacant (e.g., parked) if the need arises to do so. For example, a smart vehicle might need to move to avoid a potential collision or to provide space to an incoming fire truck or ambulance that is expected to arrive in the area due to an accident that has already occurred.

Relocation scenario 100 comprises vehicle 102 (e.g., a vehicle configured with smart vehicle capabilities) that is located in original location 112. Original location 112 may comprise a tracked location (e.g., a parking service may be configured to identify particular parking spots and occupants of particular parking spots either by parking pass identifiers, vehicle identifiers, or imagery collection devices that are paired with scales that indicate when a spot is occupied with a vehicle). Object 104 is subjected to trajectory 110. Trajectory 110 corresponds to an impending impact with vehicle 102 so long as vehicle 102 remains at original location 112. Vehicle 102 is configured to have an active watchdog state. The watchdog state comprises communicably coupling vehicle 102 with at least one of a remote device and a vehicle relocation service server to identify objects within a threshold distance of vehicle 102 that may be on a trajectory corresponding to an impact path with vehicle 102 while at original location 112. For example, the threshold distance may be 500 meters. Objects within 500 meters of vehicle 102 are monitored, characterized, and tracked to determine if any of the detected objects correspond to an impact path with vehicle 102 while at original location 112.

In one embodiment, moving vehicles in that area receive instructions (e.g., data packets) to warn the user to not park in specific area (e.g., when the user or a vehicle intelligence module configured for autonomous driving of the vehicle attempts to initiate a parking procedure in an area to establish original location 112, if a space is occupied then a warning may be presented to prevent the user from attempting to park the vehicle in that location). Similarly, the instructions automatically configure the car to not respond to a command to park in that area, for example, the car can display an error message or a warning message to explain that it has been instructed to not park in that area.

In one embodiment, a smart vehicle receives a command from a remote source (e.g., a server associated with the central emergency service or a base station that it is currently registered with) with instructions to re-locate to a different location. The data packets (e.g., received over cellular infrastructure or even received from a local node—such as a node on the street that is in communication with that car, receives a geographical coordinate of the new location and the car can further receive updated geographical coordinates during this "self-transport" phase. In particular, the first set of coordinates indicate a general area for the vehicle to drive to, and the updated coordinates indicate an exact position (e.g., coordinates that identify a parking spot) for the vehicle's destination. The updated coordinates might be needed in case a precise new location to park has not been identified at the time the relocation command was issued.

As shown in relocation scenario 100, safe location 106 is designated as a destination for vehicle 102. Evasive route 108 is generated for execution by the autonomous systems of vehicle 102 when a watchdog state is enabled. Evasive route 108 starts at original location 112 and ends at safe location 106. Evasive route 108 circumvents trajectory 110 of object 104 such that trajectory 110, when applied to object 104, does not yield an impact with vehicle 102. Once evasive route 108 is executed, vehicle 102 finishes the execution of evasive route 108 such that vehicle 102 is in safe location 106 and is no longer subject to an impact from object 104. In some embodiments, evasive route 108 may be modified based on real-time data received by vehicle 102 indicating a new impact risk is apparent and vehicle 102 should modify evasive route 108 to avoid an additional object trajectory.

In some embodiments, vehicle 102 interfaces with a parking assignment service. The parking assignment service may be configured to collect information about available parking spots in various locations and make such information available to the vehicles and to a central emergency service (e.g., to synchronize generation of escape trajectories for vehicle 102 with data received from a central emergency service reporting emergency vehicle routes and destinations). For example, such services may utilize or access information from vehicles when vehicles with a watchdog mode enabled may report being parked and a powertrain status (e.g., active or inactive) to determine whether a vehicle occupant is in a position to move a vehicle in the event an impending impact is determined. This reporting can also assist in identifying safe locations that are occupied or unoccupied for the planning of future escape trajectories for other vehicles.

Information and statuses reported, retrieved, and/or determined can be data such as the GPS location of the parking spot, an identifying number for the parking spot, expected time a user or driver intends to leave the vehicle in the parking spot (e.g., the vehicle or service may be communicatively coupled to a device with to calendar data of a driver of the vehicle and the driver is only parking for the duration of a business meeting). Additionally, the parking assignment service can utilize images from available street or traffic cameras to detect empty or occupied parking spots. The parking assignment service is generally aware of which locations can server as a parking spot and may be configured to interface with a relocation service server, which is configured to identify objects, characterize the objects and their trajectories, and generate escape trajectories to avoid impacts with the objects. Access to digitized maps of the streets with predetermined annotations may be a function of these interfacing services as well. Previous data available for that area (e.g., videos of a particular vehicle and typical parking durations for the vehicle) may also be utilized for identifying a need to generate and execute an evasive route to a safe location. The parking assignment service can learn and refine its map based on data from cars, video data, manual configuration, and other sources of data accessible via a communication stream or a communication network.

Figure 2:
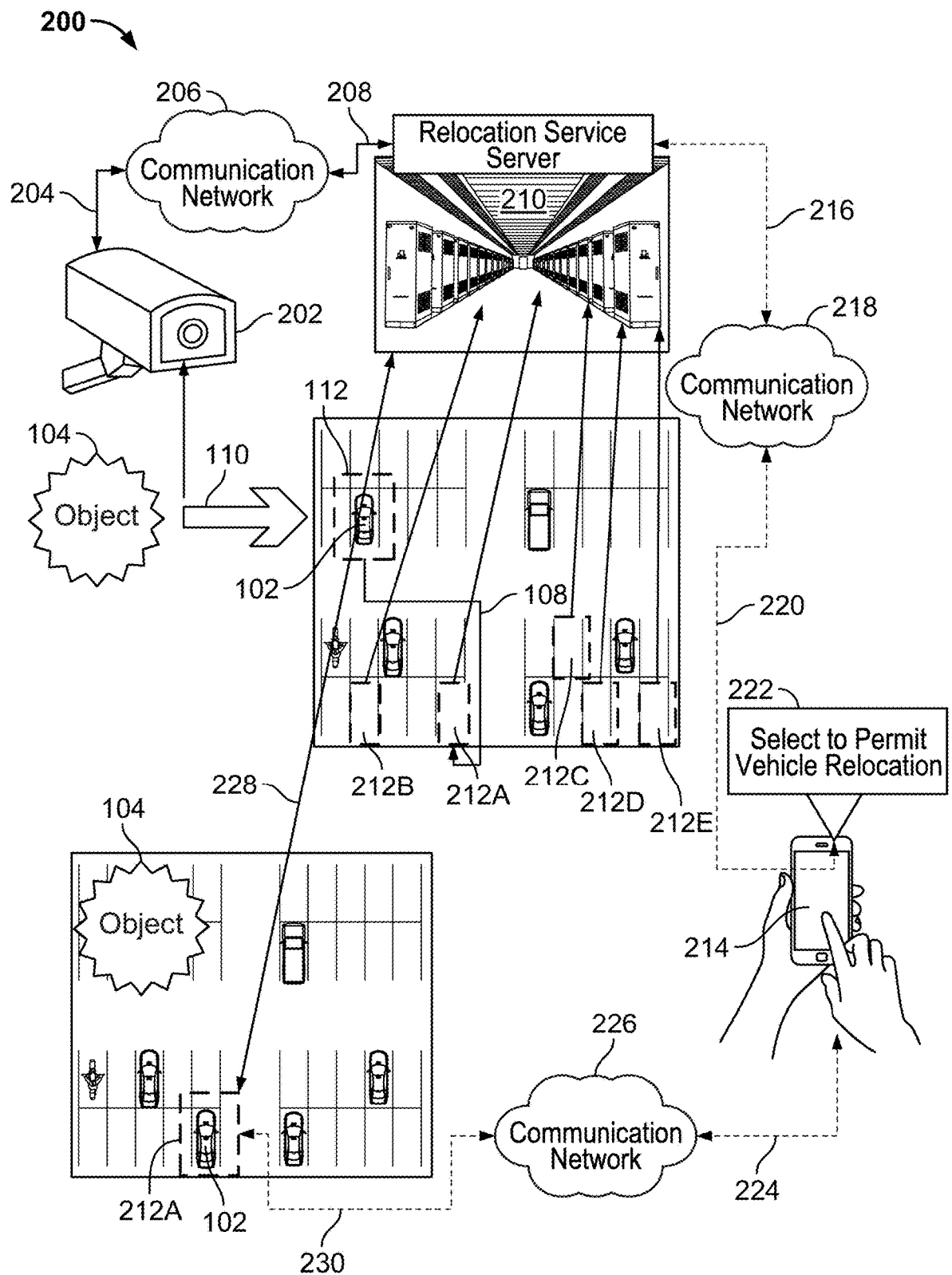

FIG. 2 depicts relocation scenario 200, in which an impending impact with stationary vehicle 202 is detected via apparatus 204 that is communicably coupled to at least one of service 206 and 208, wherein either or both of service 206 and 208 are used to identify safe location 210 for generating evasive route 212 for stationary vehicle 202 to execute, while also providing vehicle status notification 216 to remote device 214, in accordance with some embodiments of the disclosure. Although relocation scenario 200 depicts certain components and devices, relocation scenario 200 may comprise any or all of the components or device depicted in FIGS. 1, 3, 4, 7, 12, and 13. Additionally, relocation scenario 200 may be executed by using any or all of the steps depicted in the methods disclosed in FIGS. 5, 6, and 8-11.

In relocation scenario 200, vehicle 102 (e.g., a vehicle configured with smart vehicle capabilities) is shown as being located in original location 112, as shown in FIG. 1. Object 104 is subjected to trajectory 110, also as shown in FIG. 1, and trajectory 110 corresponds to an impending impact with vehicle 102 so long as vehicle 102 remains at original location 112. Vehicle 102 is configured to have an active watchdog state wherein the vehicle is configured to report status information and receive autonomous vehicle commands to avoid the impending impact with object 104. Object 104 is monitored via monitoring apparatus 202. Monitoring apparatus 202 may comprise at least one device configured to collect, process, and/or transmit at least one of GPS data, vehicle sensor data, camera data, and sonar data from within a threshold distance of vehicle 102 through communication network 206 via bilateral communication stream 204. The data is then retrieved via relocation server 210 through bilateral communication stream 208 for processing in order to characterize object 104, trajectory 110, and identify available safe locations 212A-E while also generating instructions for evasive route 108 to move vehicle 102 to safe location 212A.

In one embodiment, a Central Emergency Service "CES" is aware of the destination of first responders such as emergency services (fire trucks, ambulances, etc.) and determines which vehicles are present in the area (e.g., parked), whether any of vehicles should relocate, and initiate a relocation procedure. The CES may be a part of relocation service server 210 and may be further augmented in function by a parking service (e.g., as described in reference to FIG. 1). One method to determine which vehicles are in the vicinity is to identify the cellular base stations around the area (base stations or any other cellular communication infrastructure are usually installed in fixed locations and their geographical coordinates are known). The CES can query the base stations for unique identifiers (e.g., a vehicle identification number or "VIN") of the vehicles or can instruct the base station to issue alerts or relocation commands to such vehicles.

Additionally, the CES can trigger the vehicles to report their GPS coordinates to narrow down or hone-in on the subset of vehicles in the area that might get impacted by the presence of emergency vehicles. For example, depending on the number of first responder vehicles heading to the area, the CES might issue relocation commands to all the parked cars on a street(s) or all the parked cars on one side of the street. Additionally, the CES can instruct the base stations to alert moving vehicles in that area of the pending arrival of first responders. In one embodiment, the vehicle's owner location is determined and if their location is within a threshold distance from the car, the CES service notifies the user and asks for a permission to move their vehicle or gives them a time limit (e.g., a time counter is automatically activated on their mobile device) to return to their vehicle so that they can move it any location that they desire. The time limit is based on the estimated time of arrival of the first responders. For example, a relocation procedure must be initiated x minutes (e.g., 3 minutes) prior to the first responder's ETA. The CES might determine that if the car is not moved before the arrival of the first responder services, then the road might be blocked, and the car might not be able to move for a long time. This acts more like a warning to the owner in case they intend to leave the location anytime soon.

Figure 4:
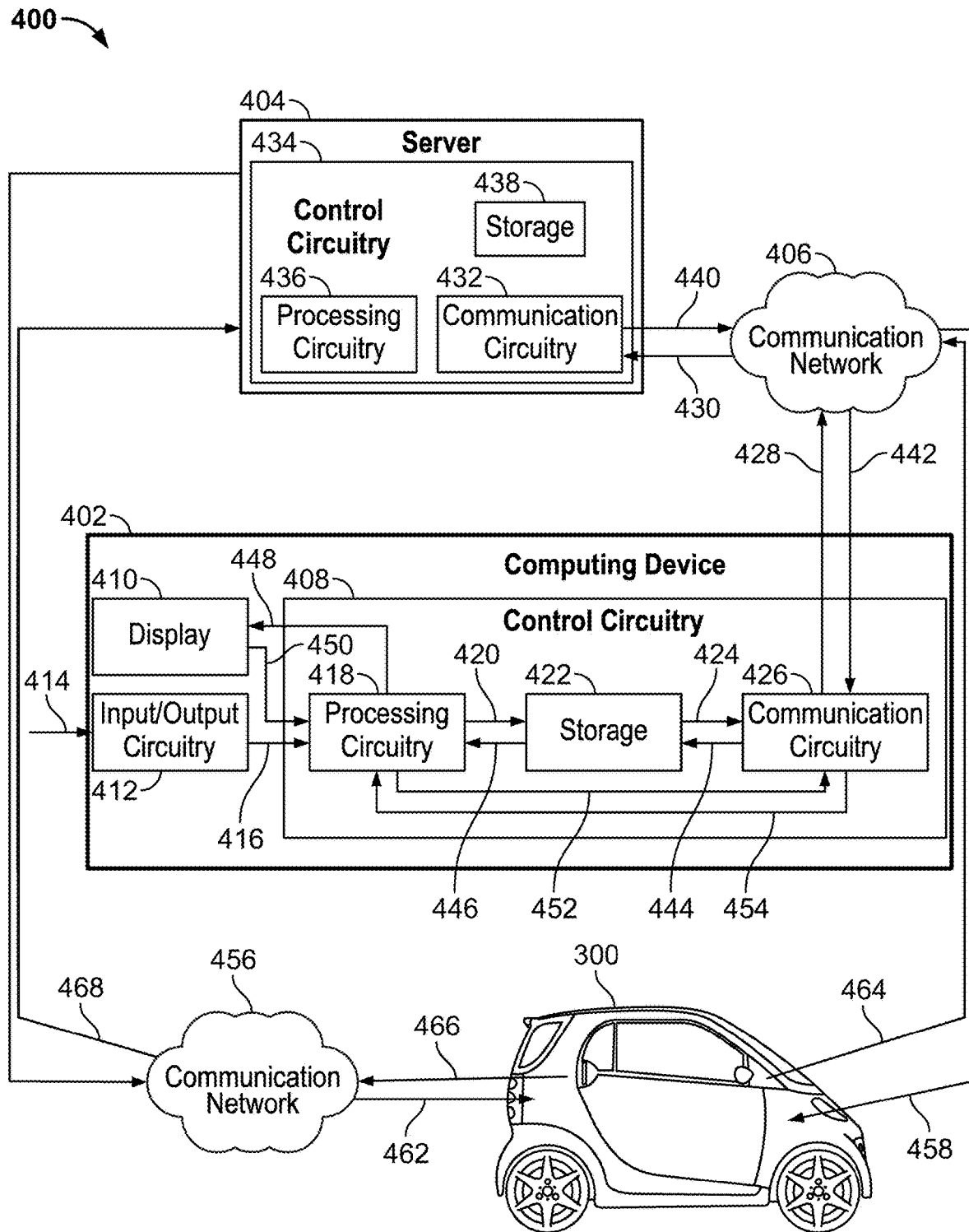
FIG. 4 is a block diagram of an exemplary stationary vehicle relocation system, in accordance with some embodiments of the disclosure.

In one embodiment, the CES queries for volunteers (e.g., only 2 cars on the side of the road need to be moved) and the owner can accept or reject the request via a communicatively coupled remote device such as remote device 214 (e.g., which may be represented by computing device 402 of FIG. 4). In another embodiment, the move could be mandatory and required by law since there might be roads where first responders require extra space to perform their duties safely and efficiently. Additionally, the type of accident (e.g., a car crash, a fire, a crime requiring a perimeter to be established) might determine which cars to move based on their proximity to the point of interest. In one embodiment, vehicles associated with first responders start to report their location to the CES when they get dispatched to a location. This way the CES is aware of all emergency vehicles on route to any place and is aware of their destination. The CES can inform smart vehicles in that area of the ETA of the first responder's vehicle(s) and make decision regarding which vehicles to relocate, and to which new location. The initial relocation command might include GPS coordinates of an area (e.g., east side of a specific street or neighborhood) depending on the car's parking orientation and/or available vacant spots in the area. For example, the CES might instruct the vehicle to start moving in the opposite or different direction of the first responder's direction (e.g., considering that CES knows the route that the ambulance is taking and trajectory 108 as generated by relocation service server 210 is configured to avoid any overlap between trajectories of tracked objects and trajectories of vehicles being relocated).

One relocation service server generates evasive route 108, information pertaining to relocation scenario 200 in transmitted in the form of instructions to generate interactive notification 222 at paired end user device 214. The information may be transmitted via bilateral communication stream 216 to communication network 218 which may then be configured to transmit the information with the instructions to paired end user device 214. Communication network 218 may be a local communication network or a broader communication network accessible via paired end user device 214. Paired end user device 214 is communicatively coupled to vehicle 102. Vehicle 102 is configured to transmit status related information to paired end used device 214 as well as receive instructions from paired end user device 214. The instructions may comprise at least one of instructions to ignore evasive route 108 as transmitted from relocation service server 210 via communication stream 228 or instructions to execute evasive route 108 and end evasive route 108 at safe location 212A. In some embodiment, the user of paired end user device 214 may be provided with options to select any of safe locations 212A-E as an end of evasive route 108. After an input is provided via paired end user device 214, an instruction based on the input is transmitted via communication stream 224 to communication network 226 for transmission to vehicle 102 via communication stream 102. Once evasive route 108 is executed or, alternatively, evasive route 108 is modified or cancelled via a user input, the final location and status of vehicle 102 is updated and transmitted back to at least one of relocation service server 210 and paired end user device 214. For example, either relocation service server or paired end user decide 214 may be used to generate an instruction to return vehicle 102 to original location 112 once object 104 is clear of an impact path with original location 112.

When the CES initiates a relocation procedure (e.g., execution of evasive route 108), the CES attempts to find a destination (e.g., parking spot) for the vehicle that is changing locations. For example, in response to initiating a relocation procedure, a traffic congestion control algorithm is triggered or invoked. The CES might find a parking spot on a different street for the vehicle to relocate to but might take actions to prevent other vehicles in the area to park in that spot before the assigned vehicle gets there. For example, the exact GPS coordinates of the parking spot can be used to issue a command that prevents vehicles that attempt to park in that spot. Additionally, that parking spot is removed from the pool of parking spots that are advertised to vehicles that attempt to park.

In one embodiment, the CES assigns priority values to the vehicles that are identified for relocation. For example, a vehicle whose owner was notified and opted to walk back to the car to manually leave the parking spot/area is assigned a low priority since the CES will unlikely need to identify an alternative parking spot for that vehicle. However, the priority values associated with cars that will be relocated automatically might be determined based on current user information. For example, a parked vehicle might publish a "parking intent duration" based on the user's calendar information or such time can be provided by the operator of the vehicle. Thus, vehicles who are expected to be parked for a short period of time can be relocated to the nearest available parking spot, while vehicles who are expected to stay parked for a longer period, can be given a lower priority in terms to how far the new parking spot will be from the current one. However, other factors can impact the priority value. For example, if the whereabouts of the owner of the vehicle is known (e.g., higher priority is given to a person who is in the area to see a doctor or to an elderly person, as opposed to someone who is in the area for lunch). Other factors can include whether there are people present in the vehicle (e.g., driver is not, but the mom and a child are), since this could indicate that driver will be returning soon and unlikely to remain parked for a long period of time.

Figure 3:
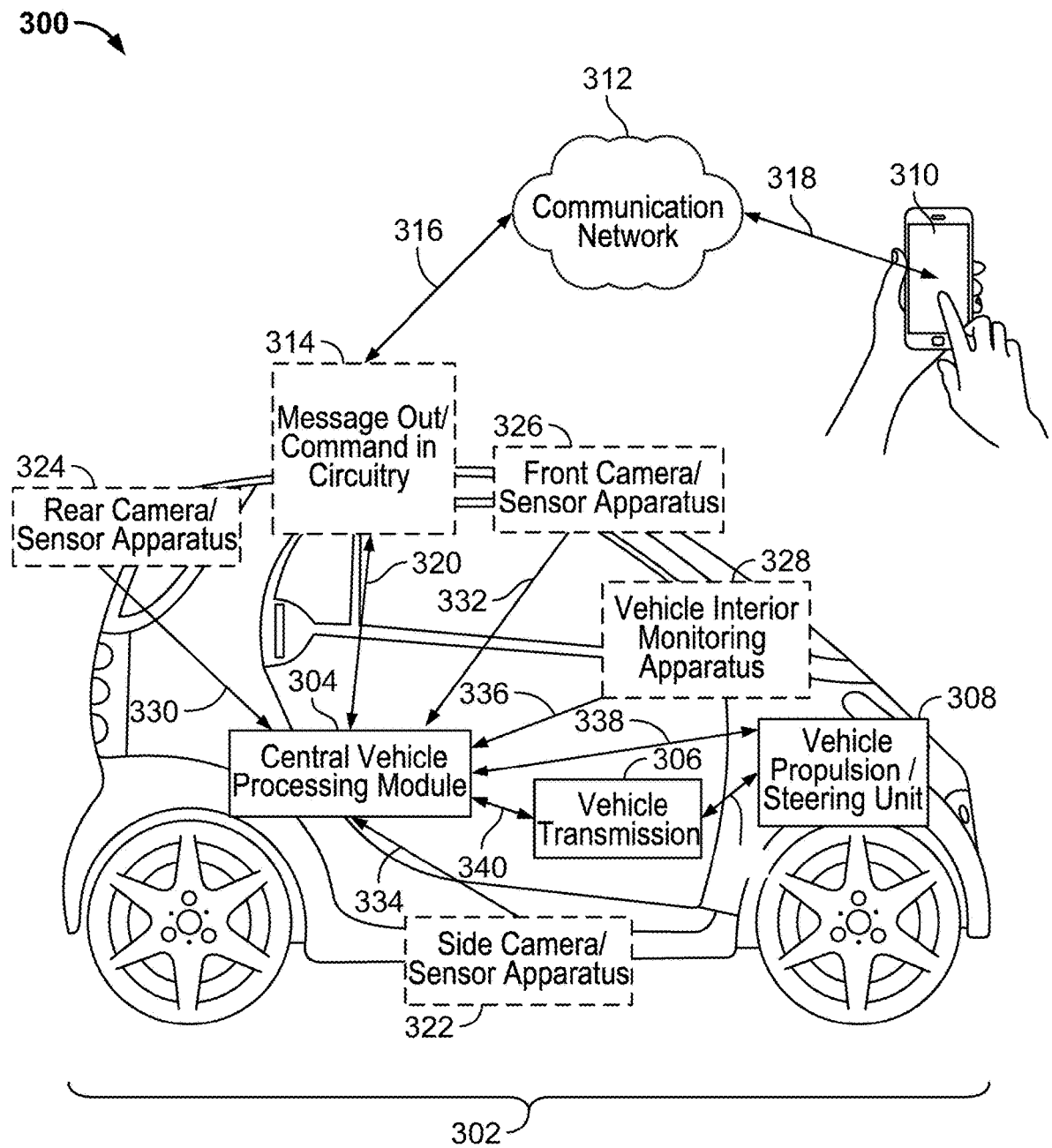
FIG. 3 is a block diagram of an exemplary vehicle system configured to interface with a stationary vehicle relocation system, in accordance with some disclosed embodiments of the disclosure.

FIG. 3 depicts vehicle system 300 configured to interface with a stationary vehicle relocation system (e.g., stationary vehicle relocation system 400 of FIG. 4), in accordance with some embodiments of the disclosure. Although vehicle system 300 depicts certain components and devices, vehicle system 300 may comprise any or all of the components or device depicted in FIGS. 1, 2, 4, 7, 12, and 13. Additionally, vehicle system 300 may be configured to execute any or all of the steps depicted in the methods disclosed in FIGS. 5, 6, and 8-11.

Vehicle system 300 comprises vehicle body 302. Vehicle body 302 is configured to enable communication between central vehicle processing module 304, vehicle transmission 306, and vehicle propulsion/steering unit 308. Vehicle processing module 304 is configured to transmit commands or instructions to various depicted modules, apparatus, and/or circuitries within vehicle body 302 based on data received from internal and external sources (e.g., from sensor units coupled to the various modules, apparatus, and/or circuitries depicted or from computing device 310 which corresponds to computing device 402 of FIG. 4). Computing device 310 is communicatively coupled or paired with vehicle body 302, and, more particularly, is configured to transmit and receive data to and from central vehicle processing module 304 via a communication network comprising message out/command in circuitry 314, communication network 312, and bilateral communication streams 316 and 318. For example, central vehicle processing module 304 may comprise computer readable instructions for regulating and initiating autonomous functions of vehicle system 300. Additionally, computing device 310 may be configured to transmit instructions based on user inputs at computing device 310 to influence or modify autonomous functions of vehicle system 300 by transmitting data via communication stream 318 through communication network 312 to be received at message out/command in circuitry 314 which translates external messages to a readable medium for central vehicle processing module 304 through vehicle communication network stream 320.

At least one of central vehicle processing module 304 and computing device 310 is configured to enable a watchdog mode. The watchdog mode is a vehicle state corresponding to vehicle system 300 that enables central vehicle processing module 304 to process commands in view of data received from various systems within vehicle body 302 to enable vehicle system 300 to autonomously move from a first location to a safe location without a vehicle occupant in order to avoid an impending impact. The watchdog mode may be activated via a remote server corresponding to a vehicle relocation service (e.g., as described in reference to FIGS. 1 and 2), may be activated by central vehicle processing module 304, may comprise a separate processing module, and may be activated or modified based on vehicle occupant inputs or user inputs via computing device 310.

Central vehicle processing module 304 is integrated into a vehicle communication network configured to transmit messages between the various modules, control circuitries and apparatus. For example, the vehicle communication network may comprise a plurality of wireless or ethernet transmission and reception nodes. The vehicle communication network may comprise a Controller Area Network (hereinafter "CAN bus"), corresponding to a robust vehicle bus standard designed to allow microcontrollers and devices to communicate with each other's applications without a host computer. It is a message-based protocol, designed originally for multiplex electrical wiring within vehicle networks. For each device, the data in a frame is transmitted sequentially but in such a way that if more than one device transmits at the same time, the highest priority device can continue while the others back off (e.g., commands from central vehicle processing module 304 are given higher priority than data received from side camera/sensor apparatus 322. Frames may be received by all devices shown in FIG. 3 or fewer than all devices comprising vehicle system 300, including by a transmitting device, to determine if transmitted messages or commands are being altered throughout the CAN bus. The amount of data transmitted and received by each device may be a function of the operational protocols of vehicle system 300 (e.g., certain devices may only have access to a limited portion of the CAN bus to prevent a risk of data or message modification through error stack up during processing).

As shown in FIG. 3, each of rear camera/sensor apparatus 324, side camera/sensor apparatus 322, front camera/sensor apparatus 326, and vehicle interior monitoring apparatus 328 provide data via each of unilateral communication streams 330, 332, 336, and 334. It is understood that in some embodiments, each of unilateral communication streams 330, 332, 336, and 334, although not depicted, may comprise bilateral communication streams if each of rear camera/sensor apparatus 324, side camera/sensor apparatus 322, front camera/sensor apparatus 326, and vehicle interior monitoring apparatus 328 comprise modules configured to be in different transmitting and receiving states based on protocols corresponding to individual states of vehicle system 300 (e.g., in some embodiments, each apparatus may have activation or deactivation protocols as determined by central vehicle processing module 304 depending on which other modules or apparatus in vehicle system 300 is active or transmitting/receiving data). Each of each of unilateral communication streams 330, 332, 336, and 334 may comprise security protocols to prevent external or unintended source from modifying or adding signals or data transmitted and received via each communication stream.

Central vehicle processing module 304 is shown having bilateral communication streams 338 and 340 coupled to vehicle propulsion/steering unit 308 and vehicle transmission 306, respectively. Each of vehicle propulsion/steering unit 308 and vehicle transmission 306 are configured to receive autonomous operation instructions from central vehicle processing module 304 in response to determining a watchdog mode is active and an impending impact requires autonomous operation of vehicle system 300 (e.g. to move vehicle body 302 from an original location to a safe location, and, in some embodiments, to return vehicle body 302 back to the original location once the original location is deemed clear of the impending impact). Additionally, vehicle propulsion/steering unit 308 and vehicle transmission 306 are communicatively coupled on the CAN bus via bilateral communication stream 342. Bilateral communication streams or unilateral communication streams may comprise security protocols and bus loads contingent on the amount of data that needs to be shared between modules and apparatus depicted in order to adequately and safely enable autonomous functions of vehicle system 300 (e.g., in the autonomous execution of escape trajectories to avoid impending impacts when no vehicle occupant is present).

FIG. 4 depicts stationary vehicle relocation system 400 configured to interface with vehicle system 300, in accordance with some embodiments of the disclosure. Although stationary vehicle relocation system 400 depicts certain components and devices, stationary vehicle relocation system 400 may comprise any or all of the components or device depicted in FIGS. 1-3, 7, 12, and 13. Additionally, stationary vehicle relocation system 400 may be configured to execute any or all of the steps depicted in the methods disclosed in FIGS. 5, 6, and 8-11.

Communication networks 406 and 456 may include one or more network systems, such as, without limitation, Internet, LAN, Wi-Fi or other network systems suitable for audio processing applications. In some embodiments, the system of FIG. 4 excludes server 404, and functionality that would otherwise be implemented by server 404 is instead implemented by other components of the system depicted by FIG. 4, such as one or more components of communication networks 406 and 456. In still other embodiments, server 404 works in conjunction with one or more components of communication networks 406 and 456 to implement certain functionality described herein in a distributed or cooperative manner. Similarly, in some embodiments, the system depicted by FIG. 4 excludes computing device 402, and functionality that would otherwise be implemented by computing device 402 is instead implemented by other components of the system depicted by FIG. 4, such as one or more components of communication networks 406 and 456 or server 404 or a combination of the same. In other embodiments, computing device 402 works in conjunction with one or more components of communication networks 406 and 456 or server 404 to implement certain functionality described herein in a distributed or cooperative manner. In some embodiments, all communications may occur over a single communication network (e.g., communication network 406 or communication network 456). Features and operations described herein in connection with communication networks 406 and 456 may be performed by either communication network 406 or communication network 456.

Computing device 402 includes control circuitry 408, display 410 and input/output circuitry 412. Control circuitry 408 may be based on any suitable processing circuitry and includes control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 408 in turn includes communication circuitry 426, storage 422 and processing circuitry 418. In some embodiments, computing device 402 or control circuitry 408 may be configured as varying embodiments, or combinations of varying embodiments, of message modification scenario 100 of FIG. 1, message modification scenario 200 of FIG. 2 and message modification scenario 300 of FIG. 3 all configured to execute the various methods as well as incorporate the various features, processes, and interfaces depicted in FIGS. 5-13.

In addition to control circuitry 408 and 434, computing device 402 and server 404 may each include storage (storage 422, and storage 438, respectively). Each of storages 422 and 438 may be an electronic storage device. As referred to herein, the phrase "electronic storage device" or "storage device" should be understood to mean any device for storing electronic data, computer software, or firmware, such as random-access memory, read-only memory, hard drives, optical drives, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 422 and 438 may be used to store various types of content, metadata, and/or other types of data (e.g., they can be used to record audio questions asked by one or more participants connected to a conference). Non-volatile memory may also be used (e.g., to launch a boot-up routine and other instructions). Cloud-based storage may be used to supplement storages 422 and 438 or instead of storages 422 and 438. In some embodiments, a user profile and messages corresponding to a chain of communication may be stored in one or more of storages 422 and 438.

In some embodiments, control circuitry 408 and/or 434 executes instructions for an application stored in memory (e.g., storage 422 and/or storage 438). Specifically, control circuitry 408 and/or 434 may be instructed by the application to perform the functions discussed herein. In some implementations, any action performed by control circuitry 408 and/or 434 may be based on instructions received from the application. For example, the application may be implemented as software or a set of executable instructions that may be stored in storage 422 and/or 438 and executed by control circuitry 408 and/or 434. In some embodiments, the application may be a client/server application where only a client application resides on computing device 402, and a server application resides on server 404.

The application may be implemented using any suitable architecture. For example, it may be a stand-alone application wholly implemented on computing device 402. In such an approach, instructions for the application are stored locally (e.g., in storage 422), and data for use by the application is downloaded on a periodic basis (e.g., from an out-of-band feed, from an Internet resource, or using another suitable approach). Control circuitry 408 may retrieve instructions for the application from storage 422 and process the instructions to perform the functionality described herein. Based on the processed instructions, control circuitry 408 may determine a type of action to perform in response to input received from input/output circuitry 412 or from communication networks 406 and 456. For example, in response to either a first or second computing device receiving a message from either the first or second computing device, control circuitry 408 may perform the steps of message modification process 500 (FIG. 5), message modification process 600 (FIG. 6), message modification process 800 (FIG. 8), message modification process 900 (FIG. 9), message modification process 1100 (FIG. 11), message modification process 1200 (FIG. 12) or processes relative to various embodiments, as depicted by but not limited to message modification scenario 100 of FIG. 1, message modification scenario 200 of FIG. 2, and message modification scenario 300 of FIG. 3 including the various processes depicted in or carried out through FIGS. 7, 10, and 13.

In client/server-based embodiments, control circuitry 408 may include communication circuitry suitable for communicating with an application server (e.g., server 404) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication networks 406 and 456). In another example of a client/server-based application, control circuitry 408 runs a web browser that interprets web pages provided by a remote server (e.g., server 404). For example, the remote server may store the instructions for the application in a storage device. The remote server may process the stored instructions using circuitry (e.g., control circuitry 434) and/or generate displays. Computing device 402 may receive the displays generated by the remote server and may display the content of the displays locally via display 410. This way, the processing of the instructions is performed remotely (e.g., by server 404) while the resulting displays, such as the display windows described elsewhere herein, are provided locally on computing device 404. Computing device 402 may receive inputs from the user via input/output circuitry 412 and transmit those inputs to the remote server for processing and generating the corresponding displays. Alternatively, computing device 402 may receive inputs from the user via input/output circuitry 412 and process and display the received inputs locally, by control circuitry 408 and display 410, respectively.

Server 404 and computing device 402 may transmit and receive content and data such as media content via communication networks 406 and 456. For example, server 404 may be a media content provider, and computing device 404 may be a smart television configured to download or stream media content, such as a live news broadcast, from server 404. Control circuitry 434, 408 may send and receive commands, requests, and other suitable data through communication networks 406 and 456 using communication circuitry 432, 426, respectively. Alternatively, control circuitry 434, 408 may communicate directly with each other using communication circuitry 432, 426, respectively, avoiding communication networks 406 and 456.

It is understood that computing device 402 is not limited to the embodiments and methods shown and described herein. In nonlimiting examples, computing device 402 may be a television, a Smart TV, a set-top box, an integrated receiver decoder (IRD) for handling satellite television, a digital storage device, a digital media receiver (DMR), a digital media adapter (DMA), a streaming media device, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same capable of suitably displaying and manipulating media content.

Computing device 402 receives user input 414 at input/output circuitry 412. For example, computing device 402 may receive a user input such as a user swipe or user touch. In some embodiments, computing device 402 is a media device (or player) configured as message modification scenario 100 of FIG. 1, message modification scenario 200 of FIG. 2, and/or message modification scenario 300 of FIG. 3 with the capability to execute any of the authentication methods described therein. It is understood that computing device 402 is not limited to the embodiments and methods shown and described herein.

User input 414 may be received from a user selection-capturing interface that is separate from device 402, such as a remote-control device, trackpad or any other suitable user movement-sensitive, audio-sensitive or capture devices, or as part of device 402, such as a touchscreen of display 410. Transmission of user input 414 to computing device 402 may be accomplished using a wired connection, such as an audio cable, USB cable, ethernet cable or the like attached to a corresponding input port at a local device, or may be accomplished using a wireless connection, such as Bluetooth, Wi-Fi, WiMAX, GSM, UTMS, CDMA, TDMA, 3G, 4G, 4G LTE, 5G, or any other suitable wireless transmission protocol. Input/output circuitry 312 may include a physical input port such as a 3.5 mm audio jack, RCA audio jack, USB port, ethernet port, or any other suitable connection for receiving audio over a wired connection, or may include a wireless receiver configured to receive data via Bluetooth, Wi-Fi, WiMAX, GSM, UTMS, CDMA, TDMA, 3G, 4G, 4G LTE, 5G, or other wireless transmission protocols.

Processing circuitry 418 may receive user input 414 from input/output circuitry 412 using communication path 416. Processing circuitry 418 may convert or translate the received user input 414 that may be in the form of audio data, visual data, gestures or movement to digital signals. In some embodiments, input/output circuitry 412 performs the translation to digital signals. In some embodiments, processing circuitry 418 (or processing circuitry 436, as the case may be) carries out disclosed processes and methods. For example, processing circuitry 418 or processing circuitry 436 may perform the steps of message modification process 500 (FIG. 5), message modification process 600 (FIG. 6), message modification process 800 (FIG. 8), message modification process 900 (FIG. 9), message modification process 1100 (FIG. 11), message modification process 1200 (FIG. 12) or processes relative to various embodiments, as depicted by but not limited to message modification scenario 100 of FIG. 1, message modification scenario 200 of FIG. 2, and message modification scenario 300 of FIG. 3 including the various processes depicted in or carried out through FIGS. 7, 10, and 13.

Processing circuitry 418 may provide requests to storage 422 by communication path 420. Storage 422 may provide requested information to processing circuitry 418 by communication path 446. Storage 422 may transfer a request for information to communication circuitry 426 which may translate or encode the request for information to a format receivable by communication network 406 before transferring the request for information by communication path 428. Communication network 406 may forward the translated or encoded request for information to communication circuitry 432, by communication paths 430.

At communication circuitry 432, the translated or encoded request for information, received through communication path 430, is translated or decoded for processing circuitry 436, which will provide a response to the request for information based on information available through control circuitry 434 or storage 438, or a combination thereof. The response to the request for information is then provided back to communication network 406 by communication path 440 in an encoded or translated format such that communication network 406 can forward the encoded or translated response back to communication circuitry 426 by communication path 442.

At communication circuitry 426, the encoded or translated response to the request for information may be provided directly back to processing circuitry 418 by communication path 454, or may be provided to storage 422 through communication path 444, which then provides the information to processing circuitry 418 by communication path 446. Processing circuitry 418 may also provide a request for information directly to communication circuitry 426 though communication path 452, where storage 426 responds to an information request, provided through communication path 420 or 444, by communication path 424 or 446 that storage 422 does not contain information pertaining to the request from processing circuitry 418.

Processing circuitry 418 may process the response to the request received through communication paths 446 or 454 and may provide instructions to display 410 for a notification to be provided to the users through communication path 448. Display 410 may incorporate a timer for providing the notification or may rely on inputs through input/output circuitry 412 from the user, which are forwarded through processing circuitry 418 through communication path 448, to determine how long or in what format to provide the notification. When display 410 determines the display has been completed, a notification may be provided to processing circuitry 418 through communication path 450.

Vehicle system 300 of FIG. 3 is communicatively coupled to communication networks 406 and 456 in order to transmit and receive instructions, statuses, and data to each of server 404 and computing device 402. For example, vehicle system 300 may receive an instruction to activate a watchdog mode from computing device 402 based on user input 414. The instruction may be transmitted via communication stream 428 to communication network 406, which then transmits the instruction with a status update to both communication circuitry 432, corresponding to server 404 (e.g., a relocation service server), via communication stream 430 and to vehicle system 300 via communication stream 458. Additionally, server 404 may also transmit a redundant security encoded iteration of the instruction to confirm the instruction with vehicle system 300 by transmitting a message via communication stream 460 through communication network 456 which is received at vehicle system 300 via communication stream 462. Vehicle system 300 executes a change to activate watchdog mode and executes autonomous instructions (e.g., as depicted in FIGS. 1 and 2). Once the instructions are completed, vehicle system 300 may provide new data and a new status update to computing device 402 via communication stream 464 through communication network 406 and/or may transmit the same data and/or status update to server 404 via communication network 456 using communication streams 466 and 468. Additionally, updates may be provided during execution of autonomous instructions in order to request updates (e.g., via a vehicle relocation service which generates escape trajectories to safe locations) to the autonomous instructions (e.g., there is a change in the environment around vehicle system 300 during execution of autonomous instructions and a new evasive route is needed based on real-time data collected and transmitted from vehicle system 300).

The communication paths provided in FIG. 4 between computing device 402, server 404, communication network 406, and all subcomponents depicted are exemplary and may be modified to reduce processing time or enhance processing capabilities for each step in the processes disclosed herein by one skilled in the art.

Figure 5:
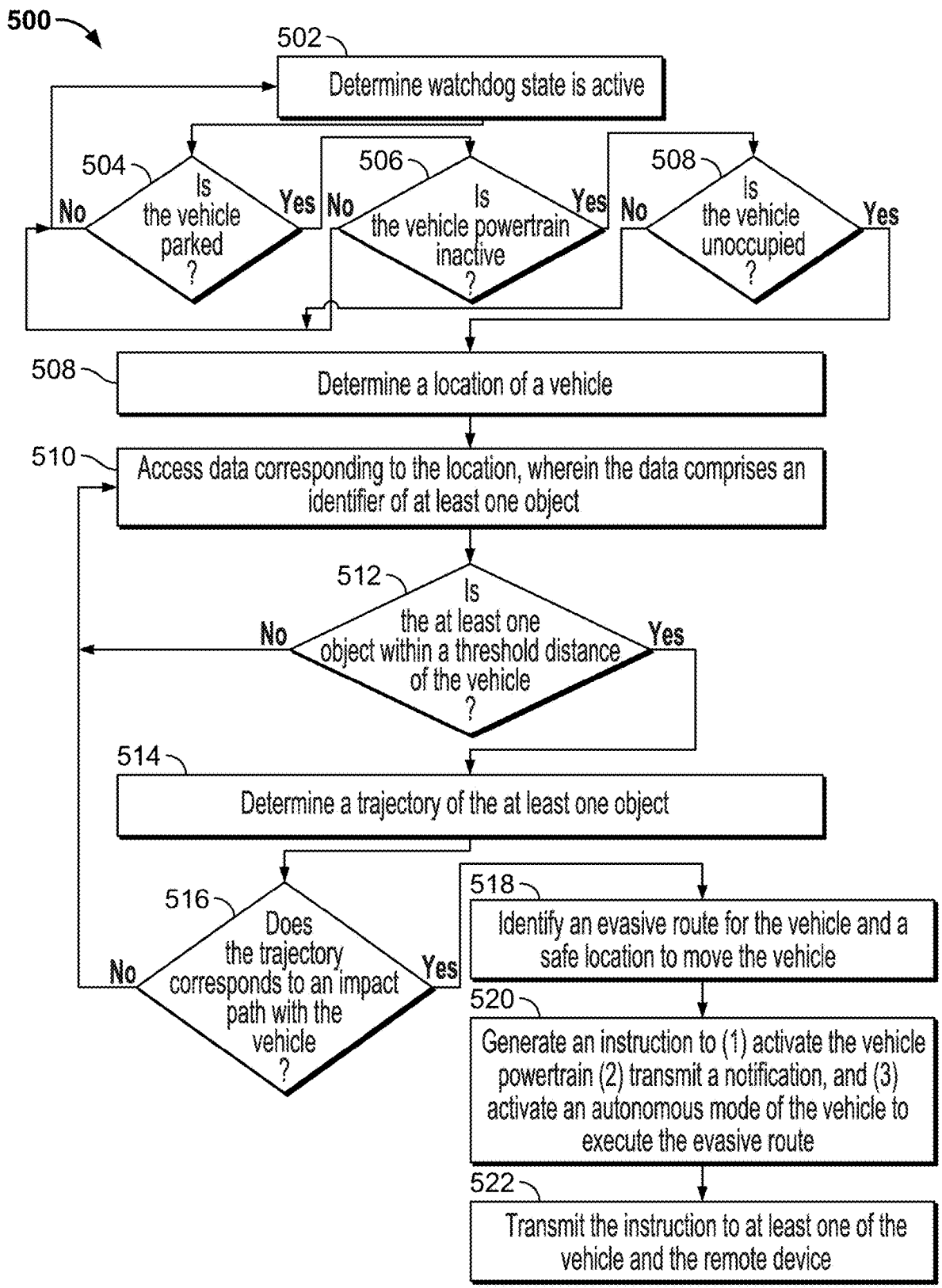
FIG. 5 is a flowchart of a method for a stationary vehicle with an inactive powertrain to relocate to a safe location in response to a detection of an impending impact with the stationary vehicle, in accordance with some embodiments of the disclosure.

FIG. 5 depicts relocation method 500, which comprises a method for a stationary vehicle with an inactive powertrain to relocate to a safe location in response to a detection of an impending impact with the stationary vehicle, in accordance with some embodiments of the disclosure. Relocation method 500 may be used to enable execution of relocation scenario 100 of FIG. 1, or relocation scenario 200 of FIG. 2. Additionally, relocation method 500 may be executed by any or all of the components depicted in FIGS. 1-4, 7, 12, and 13. Relocation method 500 may be incorporated, in whole or in part, into any of relocation method 600 of FIG. 6, relocation method 800 of FIG. 8, relocation method 900 of FIG. 9, relocation method 1000 of FIG. 10, and relocation method 1100 of FIG. 11.

At 502, a watchdog state (e.g., a watchdog mode as enabled by at least one of a central vehicle processing module or a watchdog module) is determined to be active for a vehicle system of a vehicle. For example, a vehicle user may provide an input via a vehicle relocation service, a remote device, in via a vehicle system to modify a vehicle state to activate the watchdog state such that instructions corresponding to an evasive route may be received, processed, and executed. At 504, if it is determined that the vehicle is not parked (NO at 504), then the determination of a watchdog state is revisited at 502. For example, a vehicle system may report that a transmission is not in a parked state, or a parking brake is not engaged. At 504, if it is determined that the vehicle is in a parked state (YES at 504), then the powertrain state is determined at 506. If it is determined that the powertrain is active (NO at 506), then the determination of a watchdog state is revisited at 502. If it determined that the powertrain is inactive (YES at 506), then a determination is made as to whether the vehicle is unoccupied at 508. For example, an apparatus comprising at least one of sensors (e.g., seat weight sensors) and image capturing/analysis apparatuses may be configured to determine if a vehicle passenger compartment has at least one vehicle occupant. If the vehicle is determined to be occupied (NO at 508), then the determination of a watchdog state is revisited at 502. If the vehicle is determined to be unoccupied (YES at 508), a determination of a vehicle location is made at 508 (e.g., via GPS data corresponding to the vehicle system).

At 510, data is accessed corresponding to the location, wherein the data comprises an identifier of at least one object. For example, the data may comprise any or all of sonar data, image or video data, signal interrupt data, or any characterization thereof captured in reference to a threshold distance from the location (e.g., 500 meters from the location). The data may be analyzed using object characterization software which analyzes video, images, and other data corresponding to the location. The object identifier may comprise imagery of the actual object in real-time, a string of characters, and/or an icon stored in memory in association with a vehicle relocation service (e.g., street sweepers and emergency vehicles may have preconfigured object identifiers) which may be used to generate a notification to a remote device and also may be used to generate a predicted trajectory for the object. At 512, if the at least one object is determined to not be within a threshold distance (NO at 512) of the vehicle (e.g., the data shows the object is within 500 meters of the vehicle and is not approaching the vehicle such that the actual distance is not within 300 meters of the vehicle), then data is accessed for characterizing objects within 500 meters of the vehicle at 510. At 512, if the at least one object is determined to be within a threshold distance (YES at 512) of the vehicle (e.g., the data shows the object is within 500 meters of the vehicle and is approaching the vehicle such that the actual distance is within 300 meters of the vehicle), then the data is used to determine a trajectory of the at least one object at 514. For example, a vehicle relocation service server may process available data to determine the object within 500 meters of the vehicle has a closing distance of 300 meters between the object impacts the vehicle.

At 516, if it is determined that the trajectory of the object does not correspond to an impact path with the vehicle (NO at 516), then data is accessed for characterizing objects within 500 meters of the vehicle at 510. If it is determined that the trajectory of the object does correspond to an impact path with the vehicle (YES at 516), then an evasive route for the vehicle that ends at a safe location to move the vehicle is identified at 518. For example, a vehicle relocation service server may use the object identifier and data associated with the object identifier (e.g., real-time and stored data) to find a tracked safe location and generate a recommended evasive route for the vehicle which may be modified based on real time vehicle environment detection data as collected by sensors on a vehicle system. At 520, an instruction is generated to (1) activate the vehicle powertrain, (2) transmit a notification (e.g., to a remote device and/or a relocation service server), and (3) activate an autonomous mode of the vehicle to execute the evasive route. At 522, the instruction is transmitted to at least one of the vehicle and the remote device (e.g., such that the vehicle is configured to automatically execute the instructions absent a modification to the instruction as input to the remote device and then transmitted to at least one of the vehicle and the vehicle relocation service server).

Figure 6:
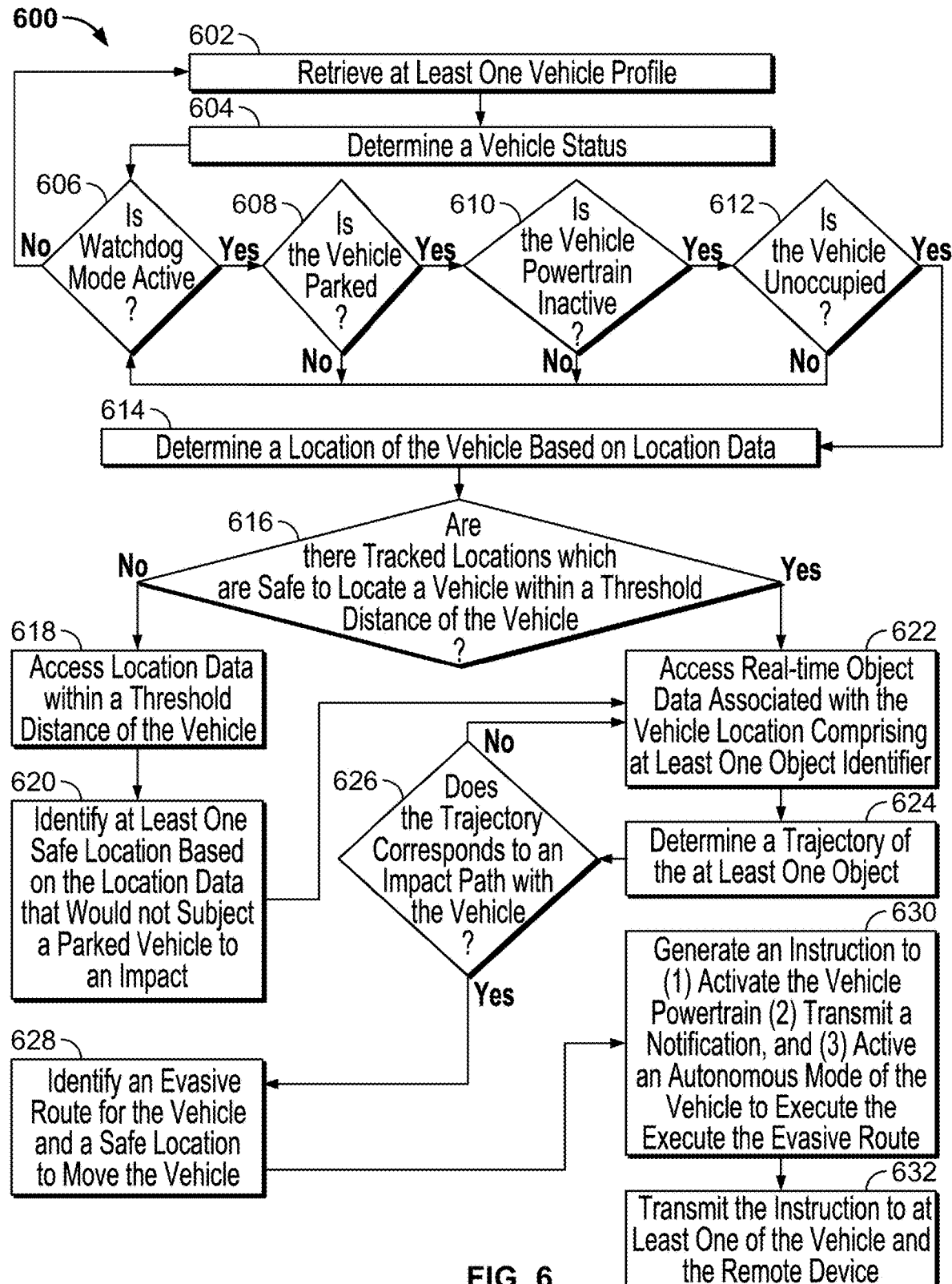
FIG. 6 is a flowchart of a method for a service to identify a safe location for a stationary vehicle with an inactive powertrain to relocate to in response to a detection of an impending impact with the stationary vehicle, in accordance with some embodiment of the disclosure.

FIG. 6 depicts relocation method 600, which comprises a method for a service to identify a safe location for a stationary vehicle with an inactive powertrain to relocate to in response to a detection of an impending impact with the stationary vehicle, in accordance with some embodiment of the disclosure. Relocation method 600 may be used to enable execution of relocation scenario 100 of FIG. 1, or relocation scenario 200 of FIG. 2. Additionally, relocation method 600 may be executed by any or all of the components depicted in FIGS. 1-4, 7, 12 and 13. Relocation method 600 may be incorporated, in whole or in part, into any of relocation method 500 of FIG. 5, relocation method 800 of FIG. 8, relocation method 900 of FIG. 9, relocation method 1000 of FIG. 10, and relocation method 1100 of FIG. 11.

At 602, at least one vehicle profile is retrieved corresponding to a vehicle system configured to execute an autonomous evasive route when an impending impact is detected with respect to the vehicle's location. At 604, a vehicle status is determined, wherein the vehicle status corresponds to data indicate of the status of a watchdog state, a parking status of the vehicle, a powertrain status of the vehicle, and the occupancy status of the vehicle. If, at 606, a watchdog state (e.g., a watchdog mode as enabled by at least one of a central vehicle processing module or a watchdog module) is determined to be inactive for a vehicle system of a vehicle (NO at 606), then at least one vehicle profile is retrieved at 602. If at watchdog state is determined to be active (YES at 606), then a parking status of the vehicle is determined at 608. For example, a vehicle user may provide an input via a vehicle relocation service, a remote device, in via a vehicle system to modify a vehicle state to activate the watchdog state such that instructions corresponding to an evasive route may be received, processed, and executed. At 608, if it is determined that the vehicle is not parked (NO at 608), then the determination of a watchdog state is revisited at 606. For example, a vehicle system may report that a transmission is not in a parked state, or a parking brake is not engaged. At 608, if it is determined that the vehicle is in a parked state (YES at 608) then the powertrain state is determined at 610. If it is determined that the powertrain is active (NO at 610), then the determination of a watchdog state is revisited at 606. If it determined that the powertrain is inactive (YES at 610), then a determination is made as to whether the vehicle is unoccupied at 612. For example, an apparatus comprising at least one of sensors (e.g., seat weight sensors) and image capturing/analysis apparatuses may be configured to determine if a vehicle passenger compartment has at least one vehicle occupant. If the vehicle is determined to be occupied (NO at 612), then the determination of a watchdog state is revisited at 606. If the vehicle is determined to be unoccupied (YES at 612), a determination of a vehicle location is made at 614 (e.g., via GPS data corresponding to the vehicle system).

At 616, if it is determined there are not tracked locations, which are safe to locate a vehicle, that are within a threshold distance of the vehicle (NO at 616), then location data within the threshold distance of the vehicle is accessed at 618. For example, a parking service may have a down server which cannot report the status of tracked parking spots. As a result, the system may access camera or other data to identify a location that is not subjected to an impending impact with 500 meters of the vehicle location (e.g., 500 meters may be a user setting as entered by a remote device to limit a distance which a vehicle may be autonomously relocated to in order to avoid an impending impact). At 620, at least one safe location is identified based on the location data at 620. The at least one safe location is determined to not be subjected to an impending impact should the at least one safe location be occupied by a vehicle. At 622, real-time object data associated with the vehicle location comprising at least one object identifier is accessed in order to characterize the object and the object's trajectory to determine if the object will impact the vehicle.

At 616, if it is determined there are tracked locations, which are safe to locate a vehicle, that are within a threshold distance of the vehicle (YES at 616), then real-time object data associated with the vehicle location comprising at least one object identifier is accessed in order to characterize the object and the object's trajectory to determine if the object will impact the vehicle at 622. At 624, a trajectory of the at least one object is determined. If the trajectory does not correspond to an impact path with the vehicle (NO at 626), then real-time object data is accessed at 622 to track other objects which may be on an impact path with the vehicle. If the trajectory corresponds to an impact path with the vehicle (YES at 626), then an evasive route is identified for the vehicle along with a safe location to terminate the evasive route at 628. For example, a vehicle relocation service may identify a safe parking spot from a plurality of tracked parking spots based on real-time object data which indicates the safe parking spot will not be subjected to an impact path with an object. Then, a trajectory ending at the safe location may be planned for the vehicle for autonomous execution sans a vehicle occupant. At 630, an instruction is generated to (1) activate the vehicle powertrain, (2) transmit a notification (e.g., to a remote device and/or a relocation service server), and (3) activate an autonomous mode of the vehicle to execute the evasive route. At 632, the instruction is transmitted to at least one of the vehicle and the remote device (e.g., such that the vehicle is configured to automatically execute the instructions absent a modification to the instruction as input to the remote device and then transmitted to at least one of the vehicle and the vehicle relocation service server).

Figure 7:
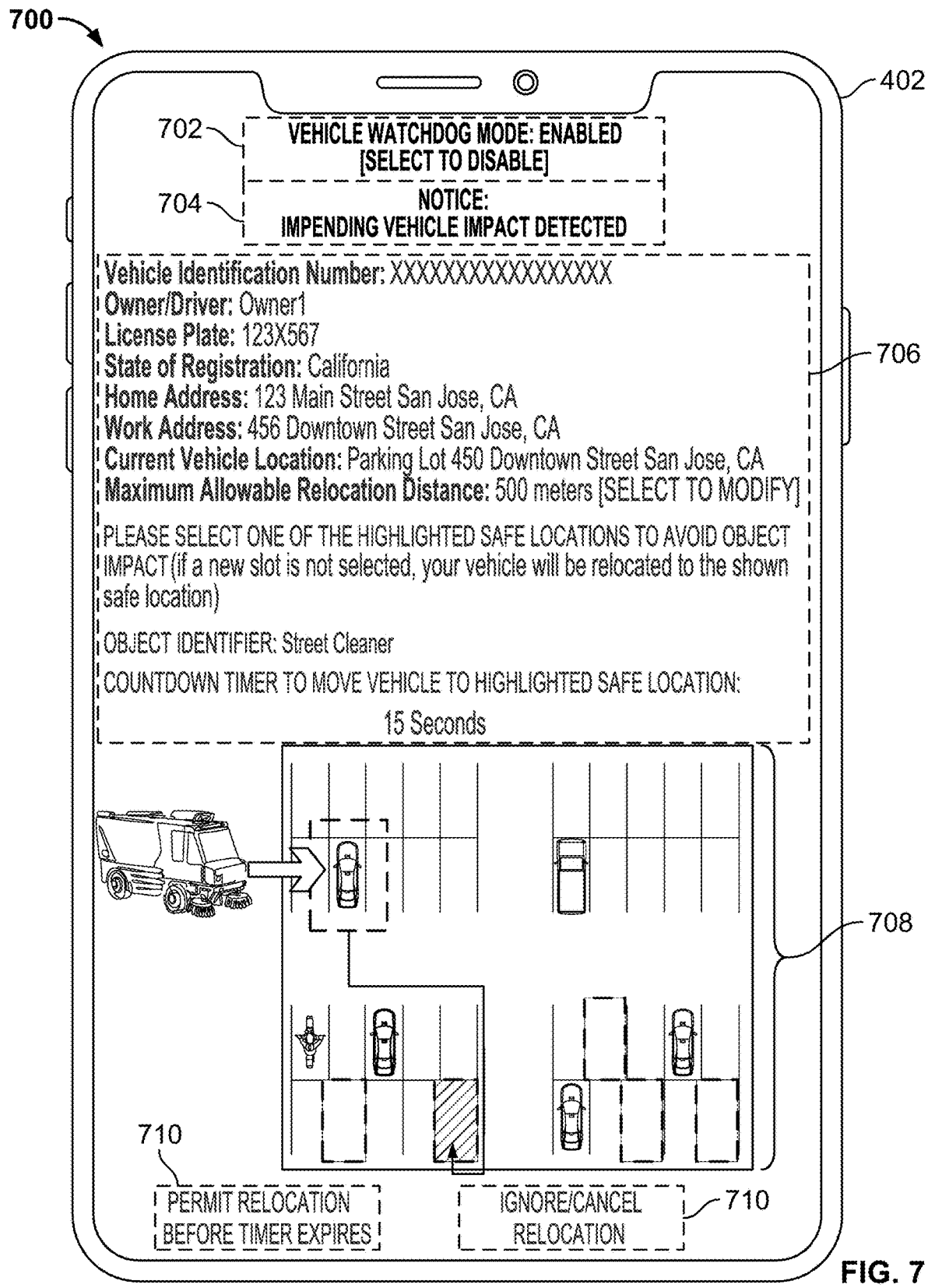
FIG. 7 is an exemplary remote device interactive interface comprising a notification regarding a status of a stationary vehicle with an inactive powertrain, in accordance with some embodiments of the disclosure.

FIG. 7 depicts interface 700, which comprises notification 706 regarding a status of a stationary vehicle with an inactive powertrain, in accordance with some embodiments of the disclosure. Interface 700 may be generated in response to the execution of relocation 100 of FIG. 1 or the execution of relocation scenario 200 of FIG. 2. Additionally, interface 700 may be generated in response to the execution of any or all of relocation method 500 of FIG. 5, relocation method 600 of FIG. 6, relocation method 800 of FIG. 8, relocation method 900 of FIG. 9, relocation method 1000 of FIG. 10, and relocation method 1100 of FIG. 11. Interface 700 may be generated on or may be caused to be generated by any or all of the components or devices depicted in FIGS. 1-4, 12, and 13.

Interface 700 corresponds to an interface associated with at least one of a vehicle configured to enable a watchdog mode to execute a relocation trajectory based on data received at least in part from a relocation service server. Interface 700 is generated for display on computing device 402 of FIG. 4, as shown in FIG. 7. Interface 700 comprises watchdog state modification option 702 that enables a user to activate and deactivate or enable/disable watchdog mode in a vehicle such that the vehicle can respond to instructions to relocate. Notice 704 comprises at least a string of characters which provide a user of computing device 402 that a vehicle paired with computing device 402 is subjected to an impending impact (e.g., as determined based on data from at least one of the vehicle and/or a vehicle relocation service server). Notification body 706 comprises a plurality of vehicle and user profile information. For example, a vehicle identification number as well as registration information may be presented for display or modification for the user of computing device 402. Additionally, notification body may comprise user profile information such as a work address, a home address, and a current vehicle location as well as a current owner or driver of the vehicle. In some embodiments, different owners/drivers may be selected in order to modify the settings associated with notification body 706 such that different profiles are configured to store different user/driver settings for watchdog mode depending on the current owner/driver of the vehicle. In some embodiments, the subject matter of notification body 706 may be updated based on registration date of the vehicle or manually entered data via interface 700 or servers/device associated with at least one of the vehicle relocation service server 210 and/or computing device 402.

Notification body 706 further comprises a maximum allowable relocation distance (e.g., 500 meters) from a current location of the vehicle which may be modifiable based on a user input. Additionally, an object identifier comprising at least one of an icon and a descriptive string of characters is generated for a user to review to determine the need to relocate the vehicle. A countdown timer is also generated to provide a user with context for a need to act and may change based on the object data associated with the object identifier (e.g., the timer may increase if the object slows down or decrease if the object accelerates prior to impacting the vehicle). Interactive relocation display 708 corresponds to a detailed view of relocation scenario 100 of FIG. 1 and relocation scenario 200 of FIG. 2 comprising selectable options for safe locations to move a vehicle based on location data. For example, a default safe location may be identified for relocation of the vehicle based on a relocation service server and a user may select an alternative safe location. Additionally, interface 700 may also comprise modification options 710 which correspond to options to relocate the vehicle prior to the countdown timer expiration of notification body 706 or may provide a user with an option to cancel/ignore the notification (e.g., the object may be a plastic bag and the user determines a relocation is not required in spite of an impending impact).

Figure 8:
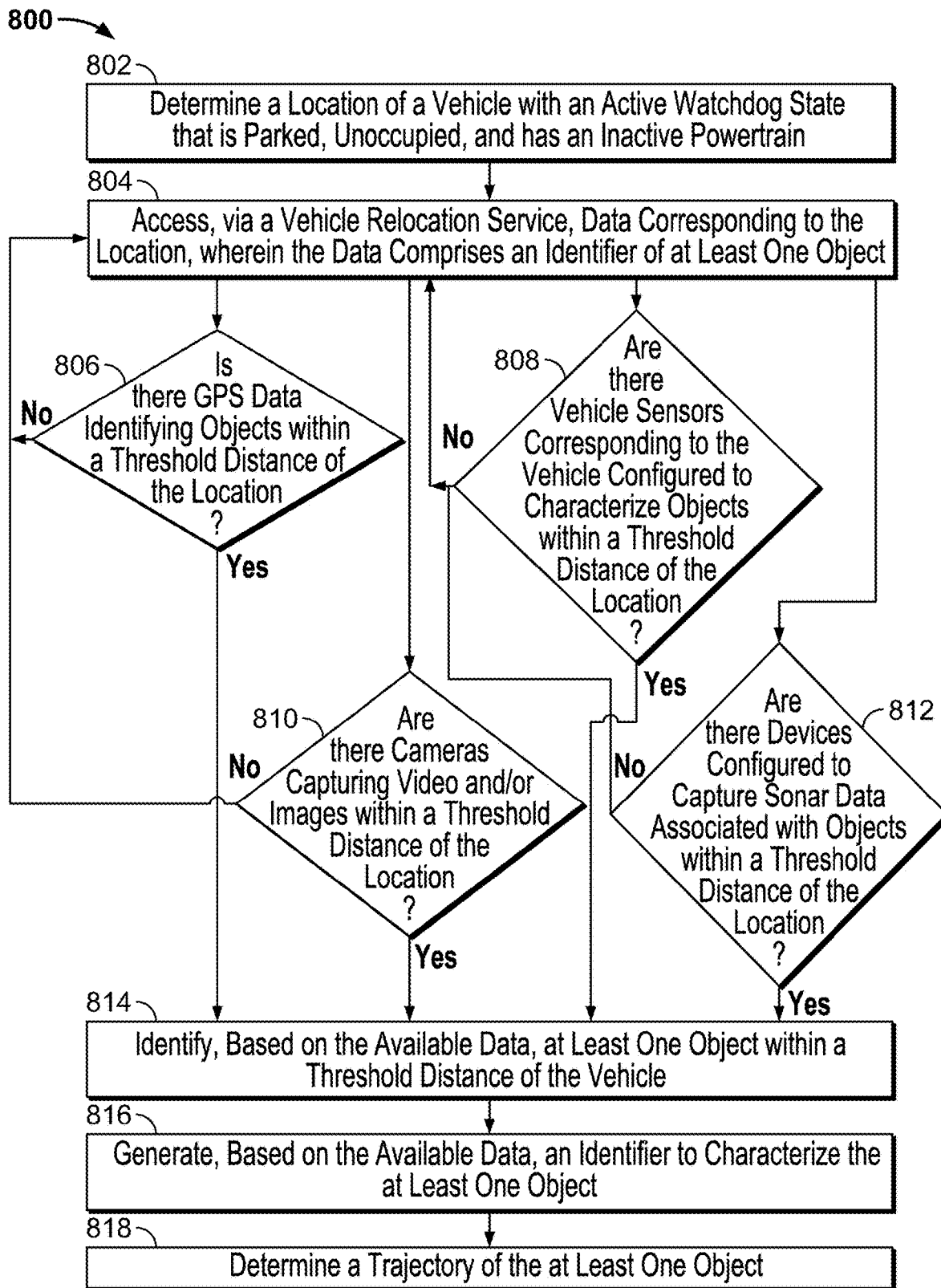
FIG. 8 is a flowchart of a method for retrieving data of different types from different sources to determine if a stationary vehicle with an inactive powertrain is at risk for an impending impact, in accordance with some embodiments of the disclosure.

FIG. 8 depicts relocation method 800, which comprises a method for retrieving data of different types from different sources to determine if a stationary vehicle with an inactive powertrain is at risk for an impending impact, in accordance with some embodiments of the disclosure. Relocation method 800 may be used to enable execution of relocation scenario 100 of FIG. 1, or relocation scenario 200 of FIG. 2.

Additionally, relocation method 800 may be executed by any or all of the components depicted in FIGS. 1-4, 7, 12, and 13. Relocation method 800 may be incorporated, in whole or in part, into any of relocation method 500 of FIG. 5, relocation method 600 of FIG. 6, relocation method 900 of FIG. 9, relocation method 1000 of FIG. 10, and relocation method 1100 of FIG. 11.

At 802, a location of a vehicle with an active watchdog state that is parked, unoccupied, and has an inactive powertrain is determined (e.g., via GPS data associated with the vehicle). At 804, a vehicle relocation service accesses data corresponding to the location, wherein the data comprises an identifier of at least one object. If none of GPS data identifying objects within a threshold distance of the vehicle, camera data capturing video/images within a threshold distance of the vehicle, vehicle sensors configured to detect objects within threshold distance of the vehicle, and devices configured to characterize objects via sonar data are arranged to transmit data for the location (NO at 806, 808, 810, and 812), then the vehicle relocation service monitors for new sources of data to accesses associated with the location at 804. If at least one of GPS data identifying objects within a threshold distance of the vehicle, camera data capturing video/images within a threshold distance of the vehicle, vehicle sensors configured to detect objects within threshold distance of the vehicle, and devices configured to characterize objects via sonar data are arranged to transmit data for the location (YES for at least one of 806, 808, 810, and 812), then the available data is used to identify at least one object within a threshold distance of the vehicle. In some embodiments, the data may include signal interrupt data (e.g., laser or infrared) that is configured to identify an object with a trajectory within a threshold distance of the vehicle. At 816, an identifier to characterize the at least one object is generated (e.g., for accessing real-time and/or stored data for trajectory analysis and also for generating an interface such as interface 700 of FIG. 7). At 818, a trajectory of the at least one object is determined (e.g., via the vehicle relocation service server and in furtherance of the execution of relocation method 500 of FIG. 5, and/or relocation method 600 of FIG. 6).

Figure 9:
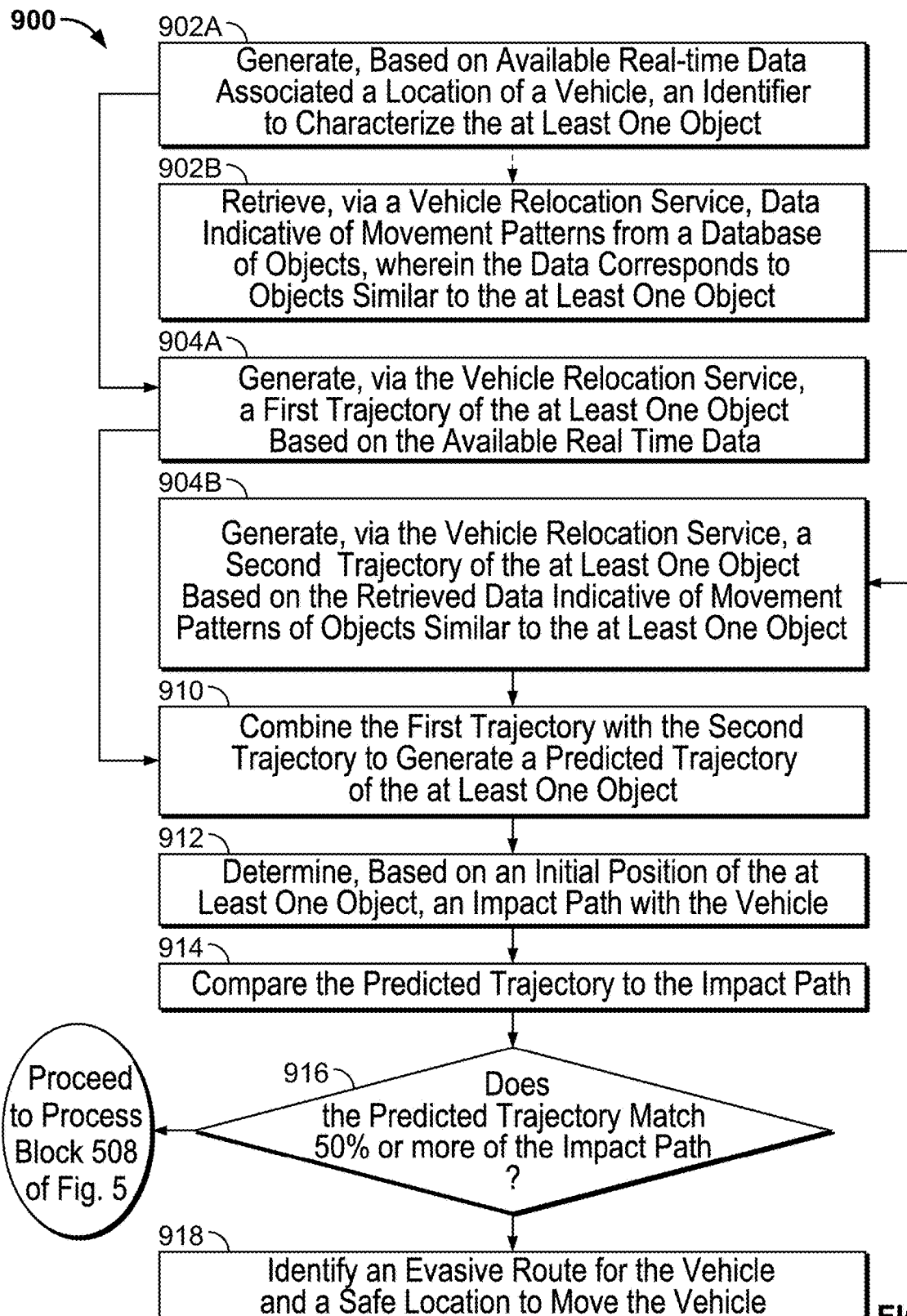
FIG. 9 is a flowchart of a method for determining whether a trajectory of an object within a threshold distance of a stationary vehicle with an inactive powertrain corresponds to an impending impact with the stationary vehicle, in accordance with some embodiments of the disclosure.

FIG. 9 depicts relocation method 900, which comprises a method for determining whether a trajectory of an object within a threshold distance of a stationary vehicle with an inactive powertrain corresponds to an impending impact with the stationary vehicle, in accordance with some embodiments of the disclosure. Relocation method 900 may be used to enable execution of relocation scenario 100 of FIG. 1, or relocation scenario 200 of FIG. 2. Additionally, relocation method 900 may be executed by any or all of the components depicted in FIGS. 1-4, 7, 12, and 13. Relocation method 900 may be incorporated, in whole or in part, into any of relocation method 500 of FIG. 5, relocation method 600 of FIG. 6, relocation method 800 of FIG. 8, relocation method 1000 of FIG. 10, and relocation method 1100 of FIG. 11.

At 902A, an identifier to characterize at least one object within a threshold distance of a location of a vehicle is generated. In some embodiments, at 902B, a vehicle relocation service retrieves data indicative of movement patterns from a database of objects, wherein the data corresponds to objects similar to the at least one object (e.g., an emergency vehicle may have different movement and final location patterns than a street sweeper or a shopping chart that is approaching a parked vehicle). At 904A, a first trajectory of the at least one object is generated based on available real-time data associated with the location (e.g., video may be analyzed to determine a projected path of travel of the object). At 904B, the vehicle relocation service generates a second trajectory of the at least one object based on the retrieved data from the databased of objects. At 910, the first trajectory and the second trajectory are combined to generate a predicted trajectory of the at least one object (e.g., the vehicle relocation service server generates the predicted trajectory for generating a possible evasive route for the vehicle). At 912, an impact path between the at least one object and the parked vehicle is determined based at least in part on an initial position of the at least one object. At 914, the predicted trajectory is compared to the impact path.

If, at 916, it is determined that the predicted trajectory does not match 50% or more of the impact trajectory (NO at 916), then the system is configured to proceed to process block 508 of FIG. 5. If, at 916, it is determined that the predicted trajectory does match 50% or more of the impact path trajectory (YES at 916), an evasive route for the vehicle and a safe location to move the vehicle at the termination of the evasive route is identified at 918. In some embodiments, the match percentage between the trajectories may be user modified. In some embodiments, the match percentage is modified based on the object identifier (e.g., objects which may be configured to cause the most damage to the vehicle such as a large emergency service vehicle may require a lower percentage match to trigger a movement of the vehicle whereas an object like a bag caught in the wind may have a lower match percentage as the risk of the bag impacting the vehicle does not include significant vehicle damage).

Figure 10:
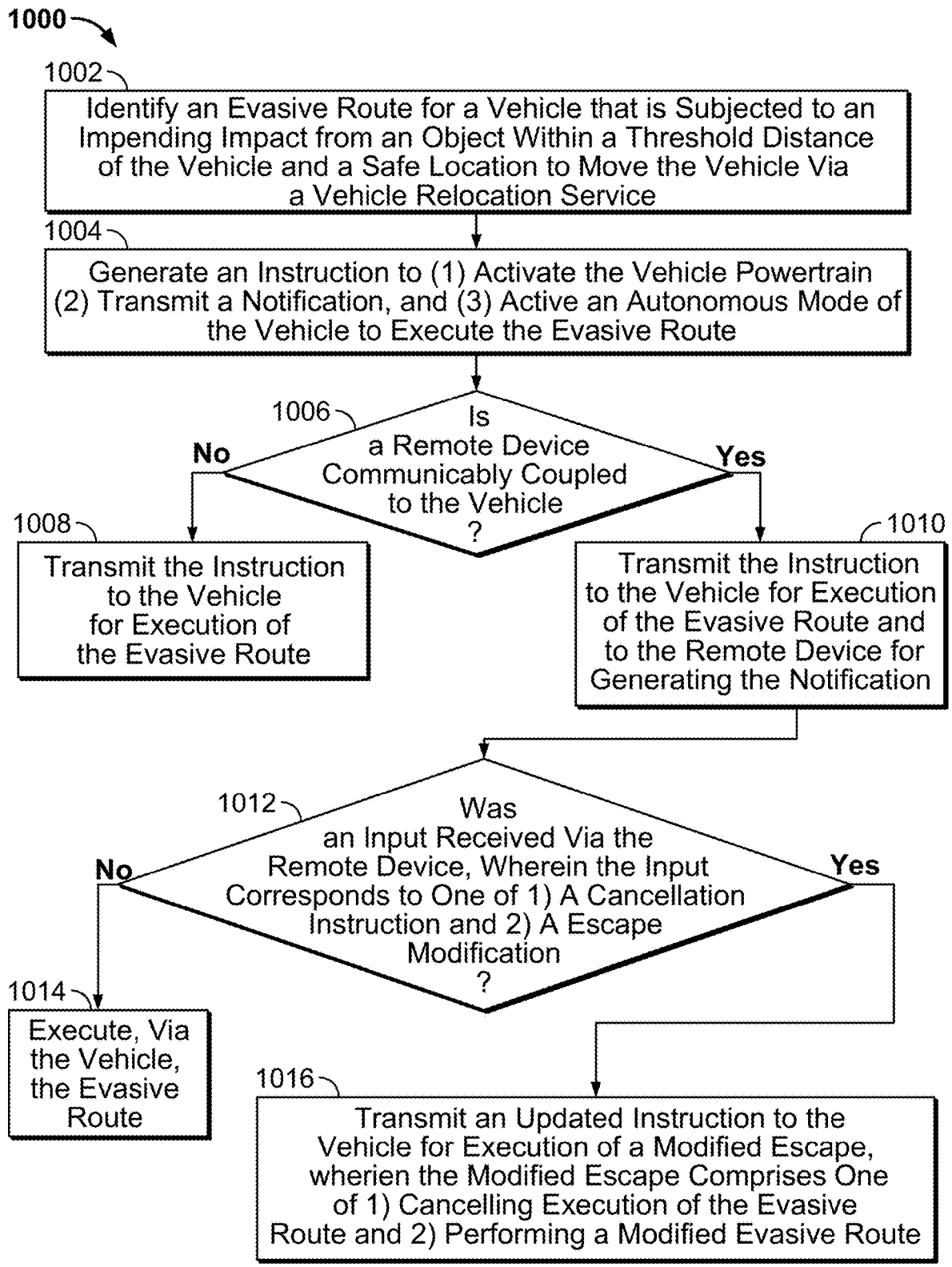
FIG. 10 is a flowchart of a method for determining whether a remote device is paired with a stationary vehicle with an inactive powertrain and for determining whether the remote device was used to provide instructions to the stationary vehicle, in accordance with some embodiments of the disclosure.

FIG. 10 depicts relocation method 1000, which comprises a method for determining whether a remote device is paired with a stationary vehicle with an inactive powertrain and for determining whether the remote device was used to provide instructions to the stationary vehicle, in accordance with some embodiments of the disclosure. Relocation method 1000 may be used to enable execution of relocation scenario 100 of FIG. 1, or relocation scenario 200 of FIG. 2. Additionally, relocation method 1000 may be executed by any or all of the components depicted in FIGS. 1-4, 7, 12, and 13. Relocation method 1000 may be incorporated, in whole or in part, into any of relocation method 500 of FIG. 5, relocation method 600 of FIG. 6, relocation method 800 of FIG. 8, relocation method 900 of FIG. 9, and relocation method 1100 of FIG. 11.

At 1002, an evasive route for a vehicle that is subjected to an impending impact from an object within a threshold distance of the vehicle and a safe location to move the vehicle (e.g., terminate the evasive route) is identifier. For example, the evasive route may comprise a plurality of transmission state changes, brake/acceleration state changes, and various steering maneuvers to navigate the vehicle autonomously without an occupant input from a location subjected to an impending impact to a safe location. At 1004, an instruction to (1) activate the vehicle powertrain (2) transmit a notification, and (3) active an autonomous mode of the vehicle to execute the execute the evasive route is generated. For example, a vehicle relocation service may rely on location data to identify obstacles between a vehicle current location and the identified safe location in order to generate a plan of navigation and movement for a vehicle configured to execute autonomous mode instructions in response to detecting a watchdog state is active for a parked, unoccupied vehicle with an inactive powertrain.

If, at 1006, it is determined that a remote device is not communicably coupled to the vehicle (NO at 1006), then the instruction for the execution of the evasive route is directly transmitted to the vehicle at 1008 (e.g., assuming a watchdog mode or state is active and configured to receive and automatically process escape trajectories for execution of autonomous vehicle functions). If, at 1006, it is determined that a remote device is communicably coupled to the vehicle (YES at 1006), then the instruction for execution of the evasive route is transmitted to both the vehicle and the remote device, wherein the remote device generates for display a notification, at 1010. If, at 1012, an input was not received via the remote device, wherein the input corresponds to one of 1) a cancellation instruction and 2) an escape modification (NO at 1012), then the vehicle executes the evasive route based on the instruction at 1014 by enabling autonomous functions on the vehicle. If, at 1012, an input is received via the remote device, wherein the input corresponds to one of 1) a cancellation instruction and 2) a escape modification (YES at 1012), then an updated instruction is transmitted (e.g., via the remote device and/or the vehicle relocation service server), for execution of a modified escape via the vehicle, wherein the modified escape comprises one of 1) cancelling execution of the evasive route and 2) performing a modified evasive route. For example, the remote device may generate interface 700 of FIG. 7 and a user may select an alternative safe location via interactive relocation display 708 of FIG. 7, or the user may select one of depicted modification options 710 of FIG. 7, resulting in cancellation of the evasive route or speeding up of the execution of the evasive route depending on the nature of the user input at the remote device.

Figure 11:
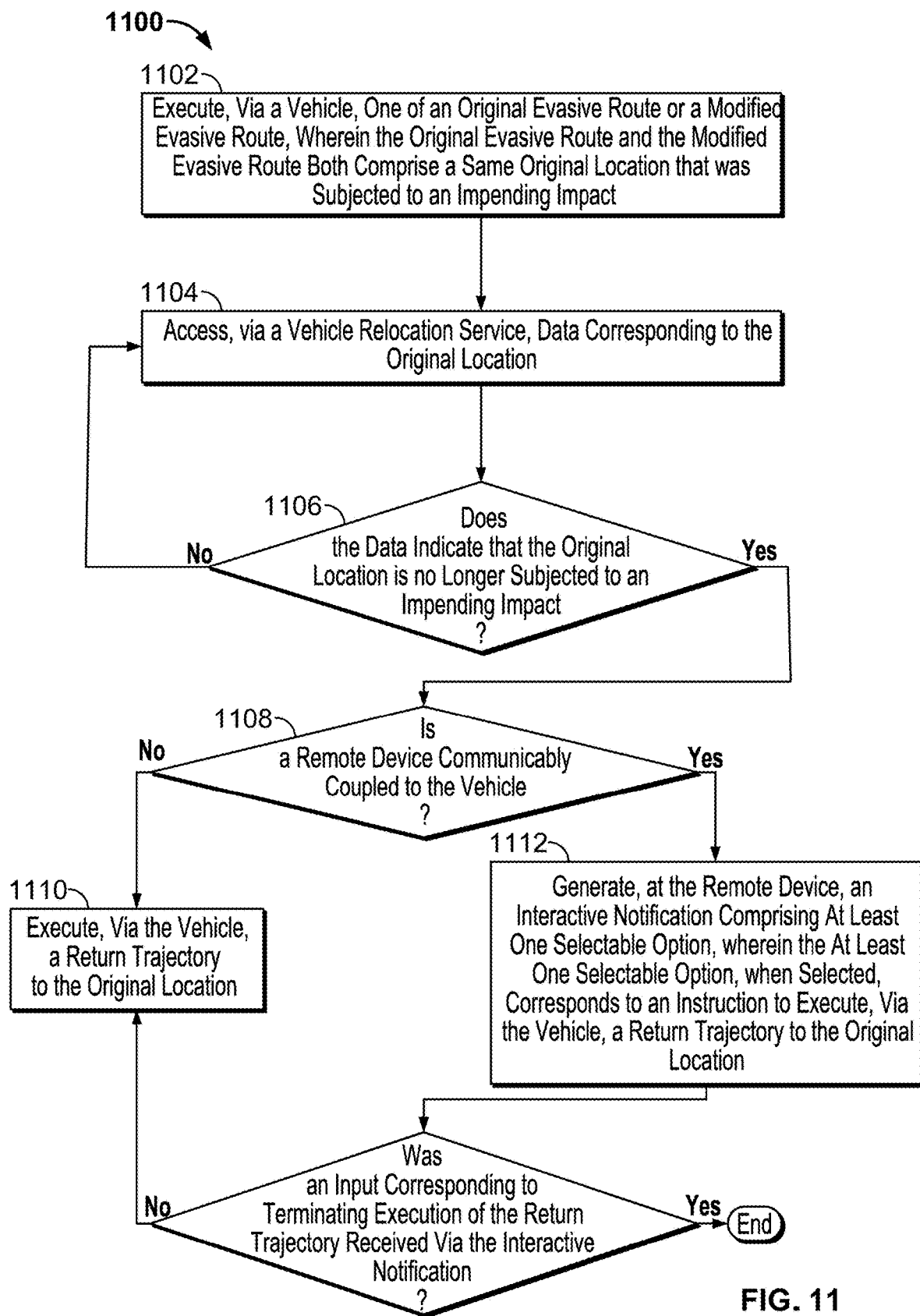
FIG. 11 is a flowchart of a method for determining a vehicle is in a safe location that is different from an original location and providing a selectable option to return the vehicle to the original location that has been cleared of an impending impact, in accordance with some embodiments of the disclosure.

FIG. 11 depicts relocation method 1100, which comprises a method for determining a vehicle is in a safe location that is different from an original location and providing a selectable option to return the vehicle to the original location that has been cleared of an impending impact; in accordance with some embodiments of the disclosure. Relocation method 1100 may be used to enable execution of relocation scenario 100 of FIG. 1, or relocation scenario 200 of FIG. 2. Additionally, relocation method 1100 may be executed by any or all of the components depicted in FIGS. 1-4, 7, 12, and 13. Relocation method 1100 may be incorporated, in whole or in part, into any of relocation method 500 of FIG. 5, relocation method 600 of FIG. 6, relocation method 800 of FIG. 8, relocation method 900 of FIG. 9, and relocation method 1000 of FIG. 10.

At 1102, a vehicle executes at least one of an original evasive route (e.g., as initially transmitted via a vehicle relocation service server) or a modified evasive route (e.g., based on real-time data inputs or user inputs via a remote device communicatively coupled to at least one of a vehicle and/or a vehicle relocation service server). The original evasive route and the modified evasive route both comprise a same original location that was subjected to an impending impact. At 1104, a vehicle relocation service accesses data corresponding to the original location (e.g., GPS and image data configured to detect and characterize objects within a threshold distance of the original location). If, at 1106, the data does not indicate that the original location is no longer subjected to an impending impact (NO at 1106), then the vehicle relocation service accesses data corresponding to the original location at 1104 for subsequent processing. If, at 1106, the data does indicate that the original location is subjected to an impending impact (YES at 1106), then a review of communicably coupled devices with the vehicle is performed at 1108. For example, local communication networks, mobile networks, or spanning networks may be reviewed for detected devices paired with the vehicle.

If, at 1108, it is determined that there is not a remote device communicable coupled to the vehicle (NO at 1108), then the vehicle executes a return trajectory to the original location at 1110. For example, a profile corresponding to the vehicle may have the return trajectory automatically enabled such that when an impact risk is determined, based on real-time data, to be gone from the original location then (e.g., via the vehicle relocation service) the vehicle receives instructions to autonomously execute a return trajectory to the original location. If, at 1108, it is determined that there is a remote device communicable coupled to the vehicle (YES at 1108), then, at the remote device, an interactive notification is generated comprising at least one selectable option, wherein the at least one selectable option, when selected, corresponds to an instruction to execute, via the vehicle, a return trajectory to the original location at 1112. If, at 1114, an input is not received, corresponding to termination of execution of the return trajectory, based on an input at the remote device, such as via interface 700 of FIG. 7 (NO at 1114), then then the vehicle executes a return trajectory to the original location at 1110. If, at 1114, an input corresponding to termination of execution of the return trajectory is received based on an input at the remote device, such as via interface 700 of FIG. 7 (NO at 1114), then the return trajectory is cancelled, and the vehicle remains in the safe location for a user to find.

Figure 12:
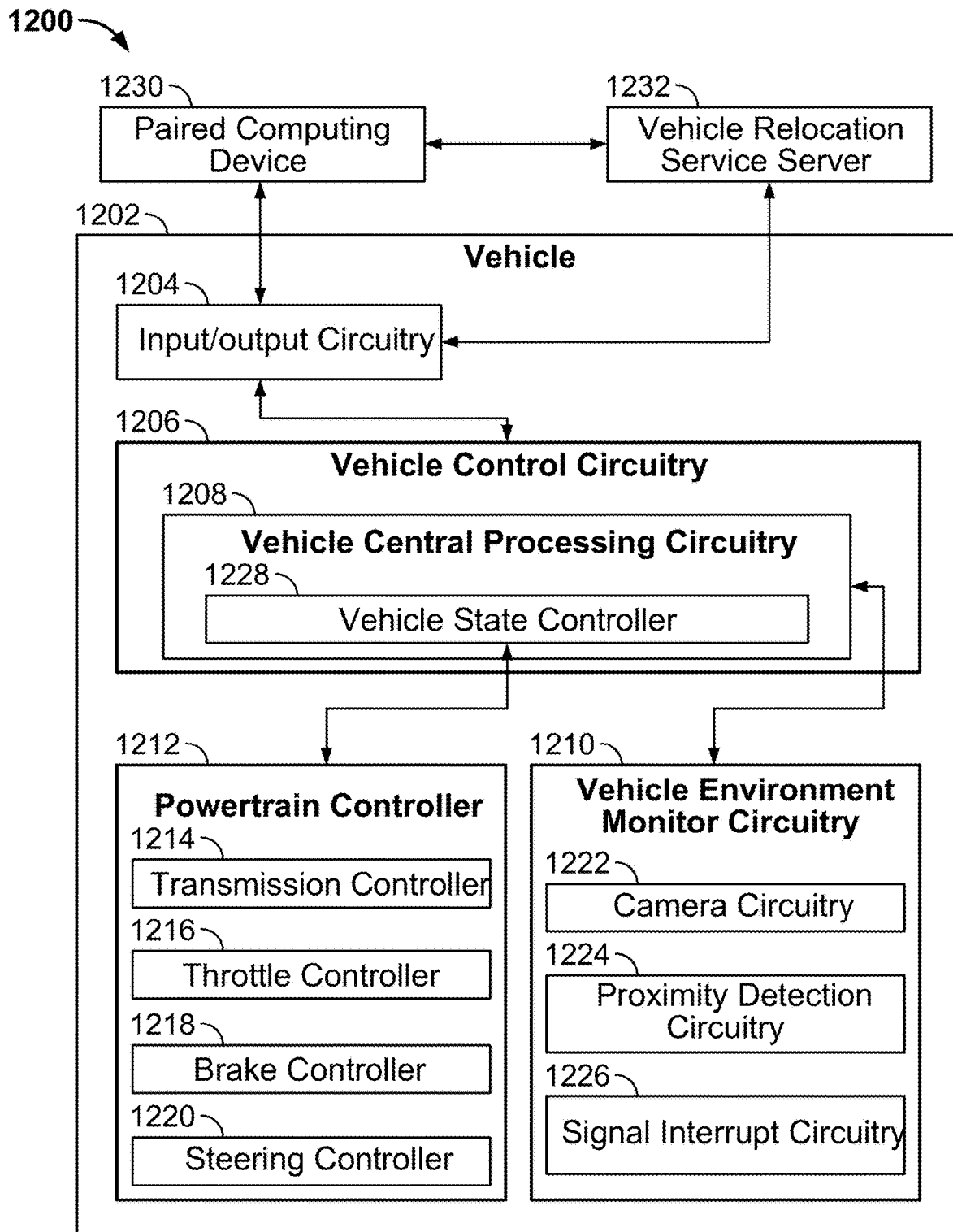
FIG. 12 is a block diagram of an exemplary vehicle system configured to receive inputs and perform autonomous functions as part of a relocation scenario, in accordance with some embodiments of the disclosure.

FIG. 12 depicts vehicle system 1200 that is configured to receive inputs and perform autonomous functions as part of a relocation scenario, in accordance with some embodiments of the disclosure. Vehicle system 1200 may be used to enable execution of relocation scenario 100 of FIG. 1, or relocation scenario 200 of FIG. 2. Additionally, vehicle system 1200 may comprise any or all of the components depicted in FIGS. 1-4 and 7. Vehicle system 1200 may utilized, in whole or in part, for the execution of any of relocation method 500 of FIG. 5, relocation method 600 of FIG. 6, relocation method 800 of FIG. 8, relocation method 900 of FIG. 9, relocation method 1000 of FIG. 10, and relocation method 1100 of FIG. 11. Vehicle system 1200 may have instructions encoded thereon to function in a manner similar to the operational diagram of vehicle state modification diagram 1300 of FIG. 13.

Vehicle system 1200 comprises vehicle 1202 which is communicably coupled with paired computing device 1230 and vehicle relocation service server 1232. Paired computing device 1230 may comprise computing device 402 of FIG. 4, and may correspond to the paired interactions with vehicle 300 of FIGS. 3 and 4. Vehicle relocation service server 1232 may be configured to support at least one of a parking service or an emergency vehicle tracking service. Additionally, vehicle relocation service server 1232 may be configured to process location data within a threshold distance of a current location of vehicle 1202 as well as be able to detect safe locations within the threshold distance of the current location of vehicle 1202. Paired computing device 1230 and vehicle relocation service server 1232 may also be communicably coupled to each other in order to provide real-time status and data updates based on data from vehicle 1202 and user inputs to each of vehicle 1202 or paired computing device 1230 in order to improve the instructions transmitted via vehicle relocation service server 1232.

Vehicle 1202 comprises input/output circuitry 1204, which may be the primary communication node with either or both of paired computing device 1230 and vehicle relocation service server 1232. Input/output circuitry 1204 may be configured to transmit vehicle data out to either of paired computing device 1230 or vehicle relocation service server 1232 while also receiving instructions thereby, which may be processed based on vehicle control circuitry 1206 protocols. Vehicle control circuitry 1206 comprises vehicle central processing circuitry 1208 and vehicle state controller 1228. Vehicle state controller 1228 may be configured to enable or disable a watchdog mode and a vehicle autonomous mode wherein, when both are enabled, vehicle 1202 is configured to execute instructions for relocation based on data from one or both of paired computing device 1230 and vehicle relocation service server 1232.

Vehicle central processing circuitry 1206 may be communicable coupled to input/output circuitry 1204 via a CAN bus and is further coupled to powertrain control 1212 and vehicle environment monitor circuitry 1210. For example, vehicle central processing circuitry may process inputs received via the CAN bus of vehicle 1202 and/or inputs from either or both of paired computing device 1230 and vehicle relocation service server 1232 to activate autonomous vehicle functions to execute an evasive route to avoid an impending impact at an original location. Powertrain controller 1212 may comprise at least one of transmission controller 1214, throttle control 1216, brake controller 1218, and steering controller 1220 in support of the execution of escape trajectories or return trajectories. Vehicle environment monitor circuitry may comprise at least one of camera circuitry 1222, proximity detection circuitry 1224, and signal interrupt circuitry 1226 for the purposes of receiving data indicative of a real-time need to modify an autonomous vehicle mode evasive route in order to avoid a new previously undetected impending impact. While the controllers and circuitry depicted are an exemplary embodiment of a vehicle system, it is understood that fewer or more than the components and elements depicted may be implemented, depending on a particular architecture on which this system is enabled.

Figure 13:
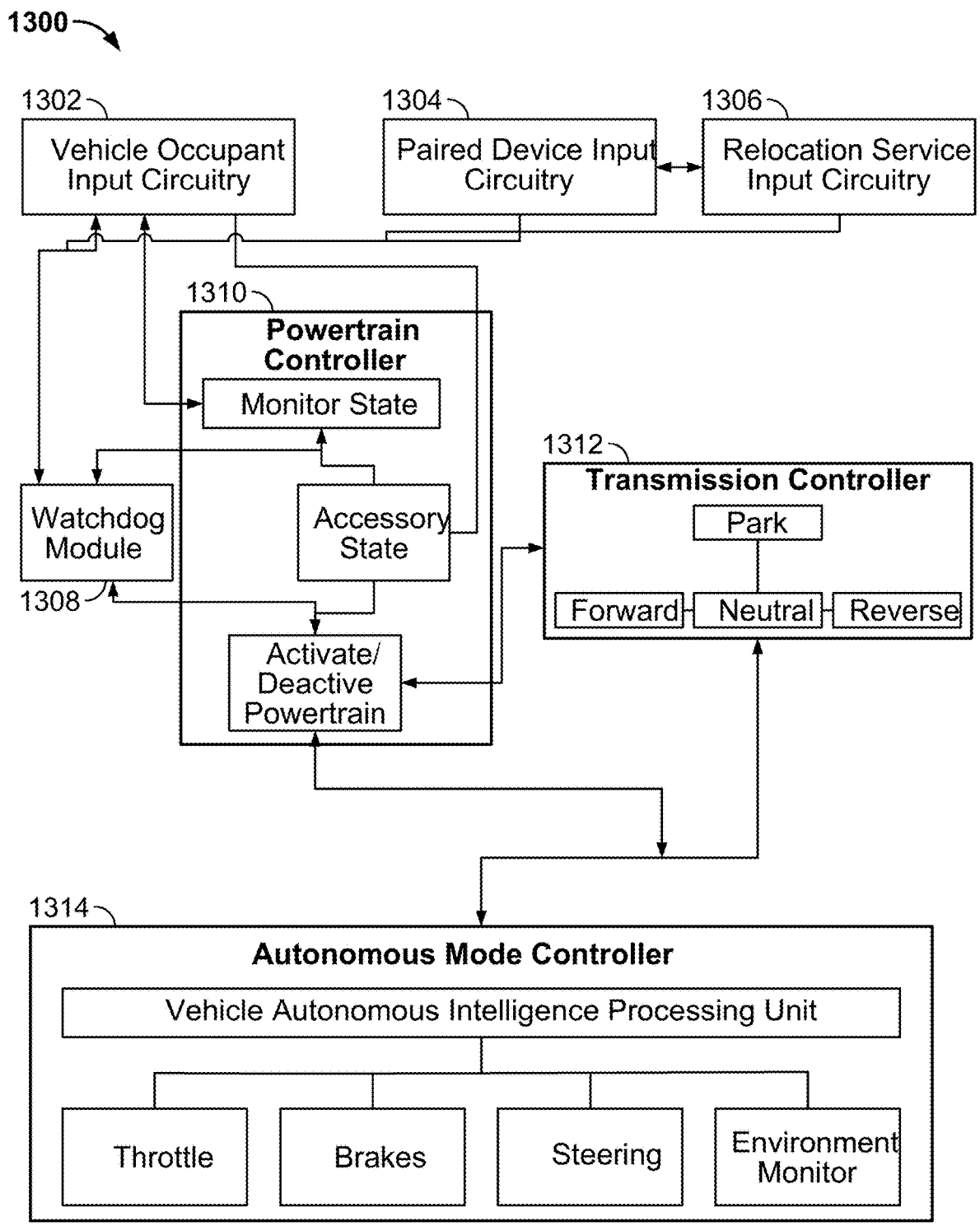
FIG. 13 is a block diagram of an exemplary vehicle system configured to interface with vehicle occupant input circuitry, paired device input circuitry, and relocation service input circuitry, in accordance with some embodiments of the disclosure.

FIG. 13 depicts vehicle state modification diagram 1300 that comprises a vehicle system configured to interface with vehicle occupant input circuitry, paired device input circuitry, and relocation service input circuitry, in accordance with some embodiments of the disclosure. Vehicle state modification diagram 1300 may be used to enable execution of relocation scenario 100 of FIG. 1, or relocation scenario 200 of FIG. 2. Additionally, vehicle state modification diagram 1300 may comprise states and signal cascades executable by any or all of the components depicted in FIGS. 1-4, 7, and 12. Vehicle state modification diagram 1300 may be configured, in whole or in part, for the execution of any of relocation method 500 of FIG. 5, relocation method 600 of FIG. 6, relocation method 800 of FIG. 8, relocation method 900 of FIG. 9, relocation method 1000 of FIG. 10, and relocation method 1100 of FIG. 11.

Vehicle state modification diagram 1300 corresponds to an exemplary flow of information between paired device input circuitry 1304 (e.g., computing device 402 of FIG. 4), relocation service input circuitry 1306 (e.g., corresponding to vehicle relocation service server 210 of FIG. 2), and vehicle occupant input circuitry 1302 (e.g., corresponding to input received via central vehicle processing module 304 of FIG. 3 over an exemplary CAN bus based on user inputs). As shown, vehicle occupant input circuitry 1302 comprises at least three outputs for modifying, via powertrain controller 1310, a powertrain state from a monitor state to an accessory state while also showing this may be accomplished by watchdog module 1308. Watchdog module 1308 may be a separate module from central vehicle processing module 304 of FIG. 3, may be incorporated into central vehicle processing module 304 of FIG. 3, or may be activated remote from the vehicle enabling watchdog state functions via remote device (e.g., paired device input circuitry 1304). For example, a user may use an ignition or activation apparatus to modify a powertrain state from "MONITOR STATE," wherein subsequent inputs are reviewed for instructions to change a state, to "ACCESSORY STATE" or may modify watchdog module 1308 from an inactive state to an active state. If an input is received via vehicle occupant input circuitry 1302 (e.g., via a user direct input, via paired device input circuitry 1304, and/or via relocation service input circuitry 1306), watchdog module 1308 may switch to an active state which corresponds to a transmitted message to active the powertrain via powertrain controller 1310.

One an active powertrain status is reported (e.g., in response to a detection of an impending impact and a need to relocate the vehicle), autonomous mode controller 1314, based at least in part from inputs received from each of a user direct input via at least one of vehicle occupant input circuitry or paired device input circuitry 1304, and/or via relocation service input circuitry 1306, is configured to receive instructions from watchdog module 1308. Autonomous mode control 1314, as depicted, comprises a vehicle autonomous intelligence unit configured to interface (e.g., via a CAN bus) with each of a vehicle throttle, a vehicle brake system, a vehicle steering system, and environmental monitoring control circuitry (e.g., as shown in FIGS. 1-4). Autonomous mode controller 1314 is further configured to interface with transmission control 1312 based on the active status of the powertrain as device by watchdog module 1308. Transmission control module is configured to enable and report various transmission states including parked, forward, neutral, and reverse. Based on evasive route instructions received or generated by watchdog module 1308, transmission controller 1312 and autonomous mode controller 1314 may modify their respective states and transmit real-time data for processing safe execution of an evasive route to relocate a stationary vehicle to a safe location. While certain controllers and circuitry are depicted in FIG. 13, is it understood that this exemplary iteration of vehicle state modification diagram 1300 is not intended to be limiting and is intended to be illustrative of a particular example of a vehicle state flowchart. Vehicle state modification diagram 1300 may comprise a plurality of arrangements of priority and communication protocols consistent with a particular vehicle architecture for implementation of various embodiments of this disclosure.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. A method comprising:
retrieving at least one vehicle profile;
determining, based on location data associated with the at least one vehicle profile, a first location of a vehicle corresponding to the at least one vehicle profile;
retrieving at least one safe location from a plurality of tracked locations, wherein the at least one safe location is within a threshold distance of the first location;
accessing, in real-time, object data associated with the first location;
in real time, and without receiving user input:
determining, based on the object data, that at least one object corresponds to a trajectory, wherein the trajectory corresponds to an impact path with the vehicle;
in response to determining that the trajectory corresponds to an impact path with the vehicle, generating an evasive route for the vehicle based on the impact path, wherein the evasive route circumvents the impact path, and wherein the evasive route terminates at the at least one safe location;
generating an instruction to activate a powertrain of the vehicle and an autonomous mode of the vehicle to execute the identified evasive route; and
transmitting the instruction to the vehicle, to enable the vehicle to execute the identified evasive route to autonomously relocate to the at least one safe location and avoid the at least one object.

2. The method of claim 1, wherein the at least one vehicle profile comprises at least one of a vehicle identification number, a license plate number, a state of registration, an owner identifier, or an owner profile.

3. The method of claim 2, wherein the owner profile comprises at least one of a residential address, a work address, a route history, or at least one frequent destination.

4. The method of claim 1, wherein the location data associated with the at least one vehicle profile corresponds to GPS data.

5. The method of claim 1, wherein retrieving the at least one safe location comprises:
identifying, based on a service, the plurality of tracked locations;
accessing, in real-time, object data associated with each of the plurality of tracked locations;
determining, based on the object data associated with each of the plurality of tracked locations, that at least one location of the plurality of tracked locations is devoid of impact paths;
assigning a safe status to the at least one location; and
transmitting data identifying the at least one location as the at least one safe location.

6. The method of claim 5, wherein the service comprises an emergency service, and wherein the emergency service is configured to identify safe locations within the threshold distance of the vehicle based on emergency data available via at least one of a police dispatcher, a medical dispatcher, or a fire department dispatcher.

7. The method of claim 5, wherein the service comprises a parking service, and wherein the parking service is configured to identify available parking locations within the threshold distance of the vehicle based on object data associated with each available parking location.

8. The method of claim 1, wherein the object data comprises at least one of GPS data, vehicle sensor data, camera data, or sonar data from devices transmitting data within the threshold distance from the at least one location.

9. The method of claim 8, further comprising:
generating at least one identifier for the at least one object corresponding to the object data associated with the first location, wherein the at least one identifier comprises descriptive information about the at least one object, including an estimated size and speed;
determining, based on object data obtained within a threshold period of time from a current time, a probability that the at least one object will maintain the trajectory corresponding to the impact path;
comparing the probability to a threshold probability; and
in response to determining the probability meets or exceeds the threshold probability, generating an instruction to display a notification at an end user device associated with the at least one vehicle profile, wherein the notification comprises the at least one identifier.

10. The method of claim 9, wherein:
the at least one safe location comprises at least two location identifiers;
the notification comprises two selectable options for each of the at least two location identifiers; and
the two selectable options, when selected, correspond to respective evasive route instructions for each respective safe location corresponding to each of the at least two location identifiers.

11. A system comprising:
an input/output circuitry communicably coupled to control circuitry configured to execute computer readable instructions; and
control circuitry configured to:
retrieve at least one vehicle profile;
determine, based on location data associated with the at least one vehicle profile, a first location of a vehicle corresponding to the at least one vehicle profile;
retrieve at least one safe location from a plurality of tracked locations, wherein the at least one safe location is within a threshold distance of the first location;
access, in real-time, object data associated with the first location;
in real time, and without receiving user input:
determine, based on the object data, that at least one object corresponds to a trajectory, wherein the trajectory corresponds to an impact path with the vehicle;
in response to determining that the trajectory corresponds to an impact path with the vehicle, generate an evasive route for the vehicle based on the impact path, wherein the evasive route circumvents the impact path, and wherein the evasive route terminates at the at least one safe location;
generate an instruction to activate a powertrain of the vehicle and an autonomous mode of the vehicle to execute the identified evasive route; and
transmit the instruction to the vehicle, to enable the vehicle to execute the identified evasive route to autonomously relocate to the a least one safe location and avoid the at least one object.

12. The system of claim 11, wherein the at least one vehicle profile comprises at least one of a vehicle identification number, a license plate number, a state of registration, an owner identifier, or an owner profile.

13. The system of claim 12, wherein the owner profile comprises at least one of a residential address, a work address, a route history, or at least one frequent destination.

14. The system of claim 11, wherein the location data associated with the at least one vehicle profile corresponds to GPS data.

15. The system of claim 11, wherein the control circuitry configured to retrieve the at least one safe location is further configured to:
identify, based on a service, the plurality of tracked locations;
access, in real-time, object data associated with each of the plurality of tracked locations;
determine, based on the object data associated with each of the plurality of tracked locations, that at least one location of the plurality of tracked locations is devoid of impact paths;
assign a safe status to the at least one location; and
transmit data identifying the at least one location as the at least one safe location.

16. The system of claim 15, wherein the service comprises an emergency service, and wherein the emergency service is configured to identify safe locations within the threshold distance of the vehicle based on emergency data available via at least one of a police dispatcher, a medical dispatcher, or a fire department dispatcher.

17. The system of claim 15, wherein the service comprises a parking service, and wherein the parking service is configured to identify available parking locations within the threshold distance of the vehicle based on object data associated with each available parking location.

18. The system of claim 11, wherein the object data comprises at least one of GPS data, vehicle sensor data, camera data, or sonar data from devices transmitting data within the threshold distance from the at least one location.

19. The system of claim 18, wherein the control circuitry is further configured to:
generate at least one identifier for at least one object corresponding to the object data associated with the first location, wherein the at least one identifier comprises descriptive information about the at least one object, including an estimated size and speed;
determine, based on object data obtained within a threshold period of time from a current time, a probability that the at least one object will maintain the trajectory corresponding to the impact path;
compare the probability to a threshold probability; and
in response to determining the probability meets or exceeds the threshold probability, generate, via the input/output circuitry, an instruction to display a notification at an end user device associated with the at least one vehicle profile, wherein the notification comprises the at least one identifier.

20. The system of claim 19, wherein:
the at least one safe location comprises at least two location identifiers;
the notification comprises two selectable options for each of the at least two location identifiers; and
the two selectable options, when selected, correspond to respective evasive route instructions for each respective safe location corresponding to each of the at least two location identifiers.

* * * * *